United States Patent
Le Saint

(10) Patent No.: US 12,047,362 B2
(45) Date of Patent: *Jul. 23, 2024

(54) SYSTEMS AND METHODS FOR SECURE MULTI-PARTY COMMUNICATIONS USING A PROXY

(71) Applicant: Visa International Service Association, San Francisco, CA (US)

(72) Inventor: Eric Le Saint, Los Altos, CA (US)

(73) Assignee: Visa International Service Association, San Francisco, CA (US)

( * ) Notice: Subject to any disclaimer, the term of this patent is extended or adjusted under 35 U.S.C. 154(b) by 437 days.

This patent is subject to a terminal disclaimer.

(21) Appl. No.: 17/395,413

(22) Filed: Aug. 5, 2021

(65) Prior Publication Data

US 2021/0385201 A1 Dec. 9, 2021

Related U.S. Application Data

(63) Continuation of application No. 16/062,619, filed as application No. PCT/US2016/067386 on Dec. 16, 2016, now Pat. No. 11,108,748.

(Continued)

(51) Int. Cl.
*G06F 21/00* (2013.01)
*H04L 9/08* (2006.01)
(Continued)

(52) U.S. Cl.
CPC ........ *H04L 63/0471* (2013.01); *H04L 9/0841* (2013.01); *H04L 63/0281* (2013.01);
(Continued)

(58) Field of Classification Search
None
See application file for complete search history.

(56) References Cited

U.S. PATENT DOCUMENTS 6,084,969 A * 7/2000 Wright ............... H04W 88/185
713/153
6,453,159 B1 9/2002 Lewis
(Continued)

FOREIGN PATENT DOCUMENTS

CN 103795692 5/2014
EP 2163067 3/2010
(Continued)

OTHER PUBLICATIONS

"Onion Routing", Wikipedia, Available online at : https://en.wikipedia.org/w/index.php?title=Onion_routing&oldid=691457365, Nov. 19, 2015, 5 pages.
(Continued)

*Primary Examiner* — Lisa C Lewis
(74) *Attorney, Agent, or Firm* — Kilpatrick Townsend & Stockton LLP

(57) ABSTRACT

Embodiments extend protocols for secure communication between two parties to allow a party to securely communicate with multiple parties using a single message. For example, the sending party can determine a unique shared secret for each recipient and encrypt data for a recipient using a session key generated from the corresponding shared secret. The encrypted data can be combined into a single message, and each recipient can decrypt only the subset of the message that it is authorized to.

20 Claims, 12 Drawing Sheets

Related U.S. Application Data

(60) Provisional application No. 62/268,348, filed on Dec. 16, 2015.

(51) Int. Cl.
   *H04L 9/40* (2022.01)
   *H04L 29/06* (2006.01)

(52) U.S. Cl.
   CPC .......... *H04L 63/0428* (2013.01); *H04L 63/06* (2013.01); *H04L 63/067* (2013.01)

(56) References Cited

U.S. PATENT DOCUMENTS

| | | | |
|---|---|---|---|
| 6,760,752 B1* | 7/2004 | Liu | H04L 63/0435 |
| 7,013,389 B1* | 3/2006 | Srivastava | H04L 9/0836 |
| | | | 713/169 |
| 7,493,661 B2 | 2/2009 | Liu et al. | |
| 7,529,933 B2 | 5/2009 | Palekar et al. | |
| 7,590,861 B2 | 9/2009 | Abdallah et al. | |
| 7,660,902 B2 | 2/2010 | Graham et al. | |
| 8,291,215 B2 | 10/2012 | Adams et al. | |
| 8,621,036 B1 | 12/2013 | L'Heureux et al. | |
| 8,831,224 B2* | 9/2014 | Bai | H04L 9/3271 |
| | | | 713/168 |
| 8,873,751 B2 | 10/2014 | Knox et al. | |
| 8,954,740 B1* | 2/2015 | Moscaritolo | H04L 63/065 |
| | | | 380/278 |
| 8,990,569 B2* | 3/2015 | Haynes | H04L 9/3263 |
| | | | 713/169 |
| 9,258,303 B1 | 2/2016 | Galwas et al. | |
| 9,426,176 B2 | 8/2016 | Duminuco et al. | |
| 9,734,355 B2 | 8/2017 | Oxford | |
| 9,860,057 B2* | 1/2018 | Smith | H04L 9/3215 |
| 9,876,635 B2* | 1/2018 | Bektchiev | G06F 11/3452 |
| 10,122,692 B2 | 11/2018 | Maccarthaigh | |
| 10,177,933 B2* | 1/2019 | Burks | H04L 63/102 |
| 10,212,597 B2 | 2/2019 | Zhang et al. | |
| 10,454,783 B2 | 10/2019 | Burks et al. | |
| 10,581,815 B2 | 3/2020 | Poornachandran et al. | |
| 2004/0205248 A1* | 10/2004 | Little | H04L 51/58 |
| | | | 726/28 |
| 2005/0066174 A1 | 3/2005 | Perlman | |
| 2008/0040603 A1 | 2/2008 | Stedron | |
| 2010/0031337 A1 | 2/2010 | Black et al. | |
| 2013/0318344 A1 | 11/2013 | Brown et al. | |
| 2014/0013121 A1 | 1/2014 | Sherkin et al. | |
| 2014/0281542 A1 | 9/2014 | Bono et al. | |
| 2015/0350119 A1 | 12/2015 | Thirumalai et al. | |
| 2017/0019248 A1 | 1/2017 | Mustafa et al. | |

FOREIGN PATENT DOCUMENTS

| | | |
|---|---|---|
| EP | 3391620 | 2/2020 |
| KR | 1020080074956 | 8/2008 |
| WO | 2017106793 | 6/2017 |
| WO | 2017214288 | 12/2017 |

OTHER PUBLICATIONS

U.S. Appl. No. 16/062,619, Final Office Action, Mailed On Dec. 28, 2020, 36 pages.
U.S. Appl. No. 16/062,619, Non-Final Office Action, Mailed On Jun. 8, 2020, 33 pages.
U.S. Appl. No. 16/062,619, "Notice Of Allowance", May 3, 2021, 12 pages.
Application No. CN201780034296.0, Notice of Decision to Grant, Mailed On Jun. 29, 2021, 4 pages.
Application No. CN201780034296.0, Office Action, Mailed On Nov. 27, 2020, 10 pages.
Application No. EP16876873.7, Extended European Search Report, Mailed On Nov. 22, 2018, 9 pages.
Application No. EP16876873.7, Notice of Decision to Grant, Mailed On Jan. 10, 2020, 2 pages.
Application No. PCT/US2016/067386, International Preliminary Report on Patentability, Mailed On Jun. 28, 2018, 13 pages.
Application No. PCT/US2016/067386, International Search Report and Written Opinion, Mailed On Apr. 3, 2017, 17 pages.
Application No. PCT/US2017/036380, International Preliminary Report on Patentability, Mailed On Dec. 20, 2018, 10 pages.
Application No. PCT/US2017/036380, International Search Report and Written Opinion, Mailed On Oct. 13, 2017, 14 pages.

* cited by examiner

SYSTEMS AND METHODS FOR SECURE MULTI-PARTY COMMUNICATIONS USING A PROXY

CROSS-REFERENCES TO RELATED APPLICATIONS

The present application is a continuation of U.S. application Ser. No. 16/062,619, filed Jun. 14, 2018, which is a 371 application of PCT Application No. PCT/US2016/067386, filed Dec. 16, 2016, which claims priority from U.S. Provisional Application No. 62/268,348, entitled "ENCRYPTION OF CONFIDENTIAL MESSAGE WITH PORTIONS FOR DIFFERENT RECIPIENTS" and filed on Dec. 16, 2015, the entire contents of which are hereby incorporated by reference for all purposes.

BACKGROUND

In addition to desktop computers, laptops, tablets, and mobile phones, various "smart" devices are becoming more prevalent. Such "smart" devices include, for example, smart watches, fitness and activity trackers, smart thermostats, smart TVs, and digital personal assistants. Each of these devices may require secure communications to a remote server in order to perform their functions. Secure communications may be required in order to authenticate the smart device with a service provider computer or other server computer in order for it to receive information or services. To establish secure communications, conventional security protocols (e.g. Transport Layer Security) may require devices to first perform a security handshake protocol with the server computer.

Further complicating matters is the fact that many smart devices execute multiple applications and may receive data or services from multiple service provider computers. In addition, some smart devices are not always connected to the communication network, but are asynchronous. For instance, some smart devices may only access the communication network in response to certain trigger conditions or after a certain interval of time. In addition, some smart devices (e.g., smart watches and activity trackers) may not have direct network communication with their corresponding service provider computer and may rely on another computing device to provide a communication path for them.

Existing systems and techniques are not well suited for such complex communication scenarios. Thus, as smart devices are become more prevalent, conducting secure communications may pose a challenge due to network complexity and the sharing of networking resources among so many devices.

BRIEF SUMMARY

Embodiments described here address the problem described above and other problems individually and collectively. Some embodiments extend protocols for secure communication between two parties to allow a party to securely communicate with multiple parties using a single message. For example, the sending party can determine a unique shared secret for each recipient and encrypt data for a recipient using a session key generated from the corresponding shared secret. The encrypted data can be combined into a single message, and each recipient can decrypt only the subset of the message that it is authorized to. Further, some recipients can act as intermediaries, and forward messages to other recipients without being able to decrypt data not intended for the intermediary.

Other embodiments are directed to systems, portable consumer devices, and computer readable media associated with methods described herein.

A better understanding of the nature and advantages of embodiments of the present invention may be gained with reference to the following detailed description and the accompanying drawings.

TERMS

Figure 1:
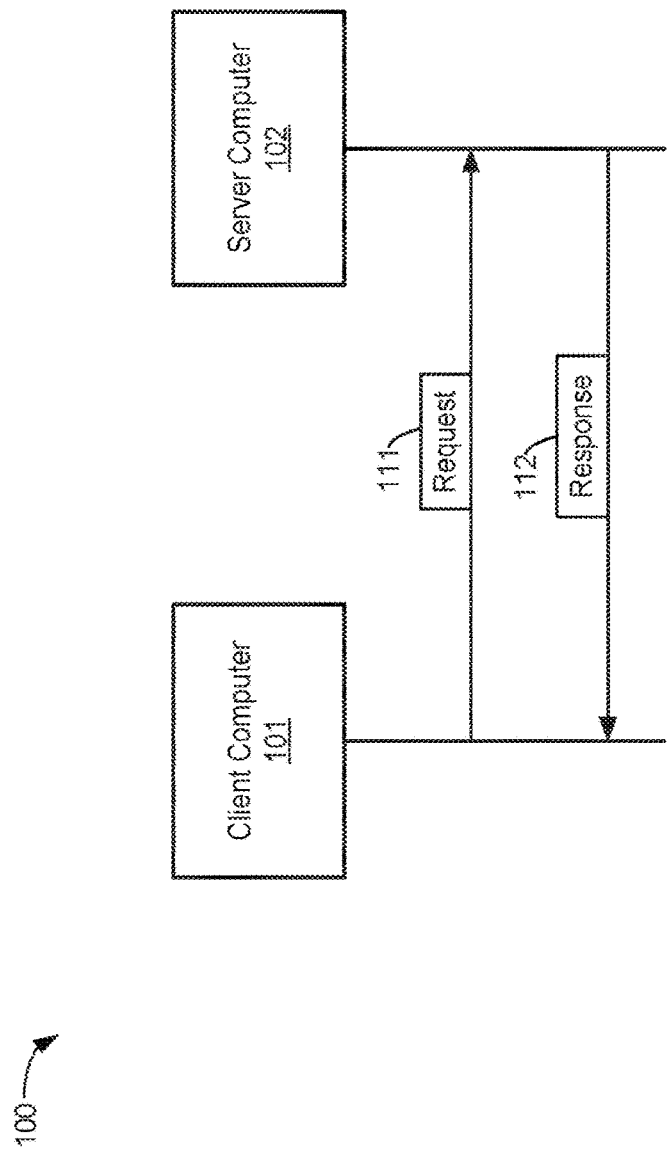
FIG. 1 is a communication flow diagram of a request from a client computer and response a server computer, in accordance with some embodiments.

Prior to discussing embodiments of the invention, description of some terms may be helpful in understanding embodiments of the invention.

The term "client computer" generally refers to a computer that requests information or a service. A client computer may comprise a computer (e.g., desktop computer), a mobile device (e.g., a smart phone, laptop, or tablet computer), or a wearable device (e.g., a smart watch or activity tracker). The client computer may include wireless communication capabilities (e.g., Wi-Fi, bluetooth, or near-field communications). In some embodiments, a client computer may communicate with a server computer. In some embodiments, a first client computer may not be capable of communicating with a server computer unless a second client computer acts as a proxy, sending and receiving messages for the first client computer.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may be a service provider computer that provides services to one or more client computers. The server computer may comprise one or more computational apparatuses and may use any of a variety of computing structures, arrangements, and compilations for servicing the requests from one or more client computers.

The term "proxy computer" refers to a computer that sends or receives messages on behalf of another computer. The proxy computer may be useful where a certain computer cannot communicate with another computer but the proxy computer can. For example, the proxy computer can be connected to the Internet while another device may only have bluetooth or near-field communication capabilities that cannot access the Internet. In some embodiments, the proxy computer may send and receive messages on behalf of numerous computers. In some embodiments the proxy computer can receive multi-party messages and send each encrypted message portion within the multi-party message to the recipient based on address information included in the multi-party message.

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" may refer to the result of apply an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" may include an electronic document or data file that uses a digital signature to bind a public key with data associated with an identity. The certificate can include a public key and a signature. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority (e.g., the signature of the certificate is generated by the certificate authority using a private key of the certificate authority).

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA also typically maintains a database of all certificates issued by the CA. In a typical certificate-signing process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

A "cryptographic nonce" may include any number, string, bit sequence, or other data value intended to be used in association with a single communication session. In some cases, a cryptographic nonce may be randomly or pseudo-randomly generated. Typically, cryptographic nonce is of sufficient length as to make insignificant the likelihood of independently generating the same nonce value multiple times. A cryptographic nonce may be used as a "blinding factor" that can be applied to a public key to "blind" or Obscure that public key, preventing it from being traced.

A "blinded key," such as a "blinded public key" may include a key that has been obfuscated or otherwise modified from its original value by combination with another data element, such as a cryptographic nonce. For example, a public key may be multiplied by the nonce to generate a "blinded public key." Similarly, a private key may be multiplied by the nonce to generate a "blinded private key."

An "encryption key" may include any data value or other information suitable to cryptographically encrypt data. A "decryption key" may include any data value or other information suitable to decrypt encrypted data. In some cases, an encryption key and a decryption key may be the same (i.e., a "symmetric key").

A "one-time key" or "ephemeral key" refers to a key that is intended to be used only once for protecting a single transaction or other communication session (e.g., a request message or a response message) between two entities (e.g., a client computer and a server computer). For instance, a client computer may use a first client key to encrypt a request message sent to a server computer. The first client key may be used by the client computer to decrypt a response message corresponding to the first request message that is sent by the server computer. However, to encrypt the next request message, the client computer may use a second, different key. Thus, the first client key is a one-time client key that is used only for protecting the first request message from the client. Similarly, a one-time server key can be used to protect a single response message from a server computer.

A one-time key can includes a key that is generated anew for each new transaction or communication session (also referred to as an "ephemeral key"). Alternatively, a plurality of one-tune keys can be generated from the same base or static key that stays the same across multiple transactions or communication sessions. Each of the plurality of one-time keys can be modified differently. For example, each of the one-time keys can be blinded different cryptographic nonce, identification factor, or other blinding factors, or otherwise obfuscated differently.

One-time keys are typically removed at the end of a transaction or communication session. In some embodiments, however, one-time keys may be maintained for a prolonged period of time. For example, during asynchronous communication with a server computer, a client computer may send a request message but may not receive the corresponding response message for a long period of time or may receive the corresponding response message out of sequence (e.g., after receipt of a response message corresponding to a later transmitted request message). In this case, the one-time key associated with the earlier request need to be saved and used to decrypt the corresponding response message. A client computer that is communicating with multiple server computers substantially concurrently may also need to store multiple one-time private keys associated with respective transactions or communication sessions in order to decrypt the corresponding response messages. Similarly, a server computer communicating with multiple client computers also need to store multiple one-time keys associated with the respective transactions or communication sessions.

A "one-time key pair" can include a private key and a corresponding public key, where at least one of the two keys changes for each new transaction or communication session. The key pair can be of any suitable format, such as elliptic curve (EC) based keys or RSA based keys. In an example, both the private key and the corresponding public key may be generated anew for each new transaction. Thus, the one-time key pair comprises an ephemeral private key and an ephemeral public key. In another example, a one-time key pair may comprise a static private key that remains the same for more than one transactions but obfuscated differently each time, and an ephemeral public key. In yet another example, a one-time key pair may comprise a static public key that remains the same for more than one transactions, but obfuscated differently each time, and an ephemeral private key. In some embodiments, both of the private key and the public key of the one-time key pair are static but one or both of the keys may be blinded, obfuscated, or otherwise modified differently for each new communication session.

A "static key pair" may include a public key (i.e., a "static public key") and a private key (i.e., a "static private key") maintained over period of time or for a given number of transactions or communication sessions. Typically, though not necessarily, a static private key may be stored securely, such as in a hardware security module (HSM) or secure element (SE). Typically, though not necessarily, a static public key may be bound to an identity through the use of a digital certificate. The static key pair may be of any suitable format, such as ECC or RSA.

A "shared secret" may include any data value or other information known only authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. A request shared secret can refer to a shared secret that is used to protect the security of a request message. A response shared secret refers to a shared secret that is used to protect the security of a response message. In some cases, a shared secret can be used to generate one or more keys. For example, a shared secret can be used to generate one or more session keys or protection keys (discussed below) for protecting the entire request or response message. As another example, a shared secret can be used to generate a plurality of keys each used to protection a portion of a message.

A "session key" may correspond to a key that is used to encrypt of decrypt a message sent via a channel between two entities. The message may include other encrypted portions that each may have their own session key when the encrypted portions are for another entity.

A "channel" or "communication channel" generally refers to an information link between two computing entities. A channel is not necessarily a physical medium connecting the two entities, but can be a conceptual path for transmitting information. A channel between two computers can also involve other entities passing or forwarding information to route the message between the two computers. For example, a first computer can establish a communication channel with a second computer over the Internet and communications between the client computer and the server computer can be routed through various network gateways. A "secure channel" can be a channel that uses encryption to secure the communications that are sent through the channel. For example, the first computer and a second computer can communicate over a secure channel by encrypting communications for each other using a session key.

DETAILED DESCRIPTION

The systems and methods described herein provide secure end-to-end communication of data between multiple computing devices. The secure end-to-end communications may be routed through a proxy computer without the proxy computer being able to access or decrypt the secure communications. In some embodiments, a source computer aggregates multiple messages for different recipient computers into a single multi-party message. The source computer can provide the multi-party message to a proxy computer, which can identify the different recipient computers from the multi-party message and then route each separate message to the intended recipient computer. In various implementations, multiple recipient computers can send response messages, and multiple source computers may send communications. Any one of these devices can be an online hub (e.g. a mobile phone or router). One advantage of the systems and methods described herein is that various pieces of data are encrypted separately, thereby allowing for the various portions to be made separately accessible. Further advantages are described below.

The systems and methods described herein can enable control of which parties can access which parts of data being communicated to multiple parties.

I. Client-Server System

FIG. 1 is a communication flow diagram 100 of a request from a client computer 101 and response a server computer 102, in accordance with some embodiments. Both the client computer 101 and server computer 102 may be any suitable computing device (e.g., mainframes, desktop or laptop computers, tablets, mobile devices, wearable devices, etc.). In communication flow diagrams herein, the boxes represent systems, devices, or data, and the arrows in the diagram point from the source of the message (e.g., the device corresponding to the box that is connected to the vertical line that the arrow beings at) to the destination of the message (e.g., the device corresponding to the box that is connected to the vertical line that the arrow points to).

In some embodiments, the client computer 101 may receive instructions to obtain certain data that is not available to the client computer 101. However, this data may be available to the server computer 102. As further described below, the client computer 101 may request the data from the server computer 102. In other embodiments, the client computer 101 may receive instructions to perform a certain action that cannot be performed by the client computer 101. However, this action may be performed by the server computer 102. As further described below, the client computer 101 may request that the action be performed by the server computer 102.

In order to obtain information, or have the action performed, the client computer 101 may send a request message 111 ("request" in FIG. 1) to the server computer 102. The request message 111 may indicate the request information or the requested action. The request message may be one or more of a TCP/IP packet, an HTTP request message, or another message format. In some embodiments, the request message 111 may be made according to the Representational state transfer (REST) application program interface (API).

In response to receiving the request message 111 from the client computer 101, the server computer 102 may process the request message 111. In processing the request message 111, the server computer 102 may determine the requested information or action and then generate a response message 112 ("response" in FIG. 1). If information is requested by the client computer 101, the response message can include the requested information. Upon generating the response message 112, the server computer 102 can send the response message 112 to the client computer 101. The response message 112 may be sent over a communication network. The response message 112 may be sent wirelessly (e.g., over Wi-Fi, bluetooth, or cellular communications, etc.) or using wired communication channels (e.g., Ethernet, USB, etc.).

The client computer 101 can receive the response message 112 sent by the server computer 102. In response to receiving the response message 112, the client computer 101 can extract any information included in the response message 112. For example, the client computer 101 may extract the information requested by the client computer 101 in the request message 111.

Using the request and response communication (e.g., request message 111 and response message 112), the client computer 101 can obtain certain data from the server computer 102, which was not available to the client computer 101, and/or the client computer 101 can have a certain action performed by the server computer 102 which could not performed by the client computer 101. Request and response communications are advantageous because they are simple (e.g., because only two communications are sent) and can be used in a variety of situations.

II. Private and Secure Request and Response Using a Proxy

A client computer can send a request message to a server computer in order to request data, or to request an action to be performed by the server computer. However, the client computer may not be in direct communication with the server computer. For example, the client computer may communicate with the server computer via a proxy computer (e.g., a network gateway, router, or hub). The proxy computer may route communications to and from both the client computer and the server computer. In some embodiments, the client computer may communicate with the proxy computer over a first secure channel and the proxy computer may communicate with the server computer over a second secure channel. As such, communications encrypted by the client computer can be decrypted by the proxy computer and then re-encrypted for routing to the server computer.

In some embodiments, the request message sent by the client computer may contain sensitive information (e.g., account data, personal information, passwords, etc.). Generally, any request message may contain sensitive information since it could be used to track the activity of the client computer. Therefore, decryption of the request message by the proxy computer enables the proxy computer to have access to the sensitive information. Even if the proxy computer is a trusted entity, any decryption of the request message from the client computer into clear text creates risk that the sensitive information will be leaked.

The client computer can improve the security of the request message by limiting the number of parties that can access it. For example, the client computer may encrypt the request message using a first shared secret that is shared with the server computer, but not the proxy computer. The client computer can further encrypt the encrypted request message using a second shared secret that is shared with the proxy computer. As such, the client computer can communicate with the proxy computer over a first secure channel while communicating with the server computer over a second secure channel, via the first secure channel with the proxy computer. Communication over the second secure channel via the first secure channel is advantageous because it enables the client computer to have secure and private end-to-end communications with the server computer while using the proxy computer to provide connection with the server computer. In addition, since the proxy computer routes communications from the client computer over a separate secure channel between the proxy computer and the server computer, the communications to the server computer may not be traced back to the client computer. Thus, the proxy computer can act as a hub that provides routing of communications and privacy.

Figure 2:
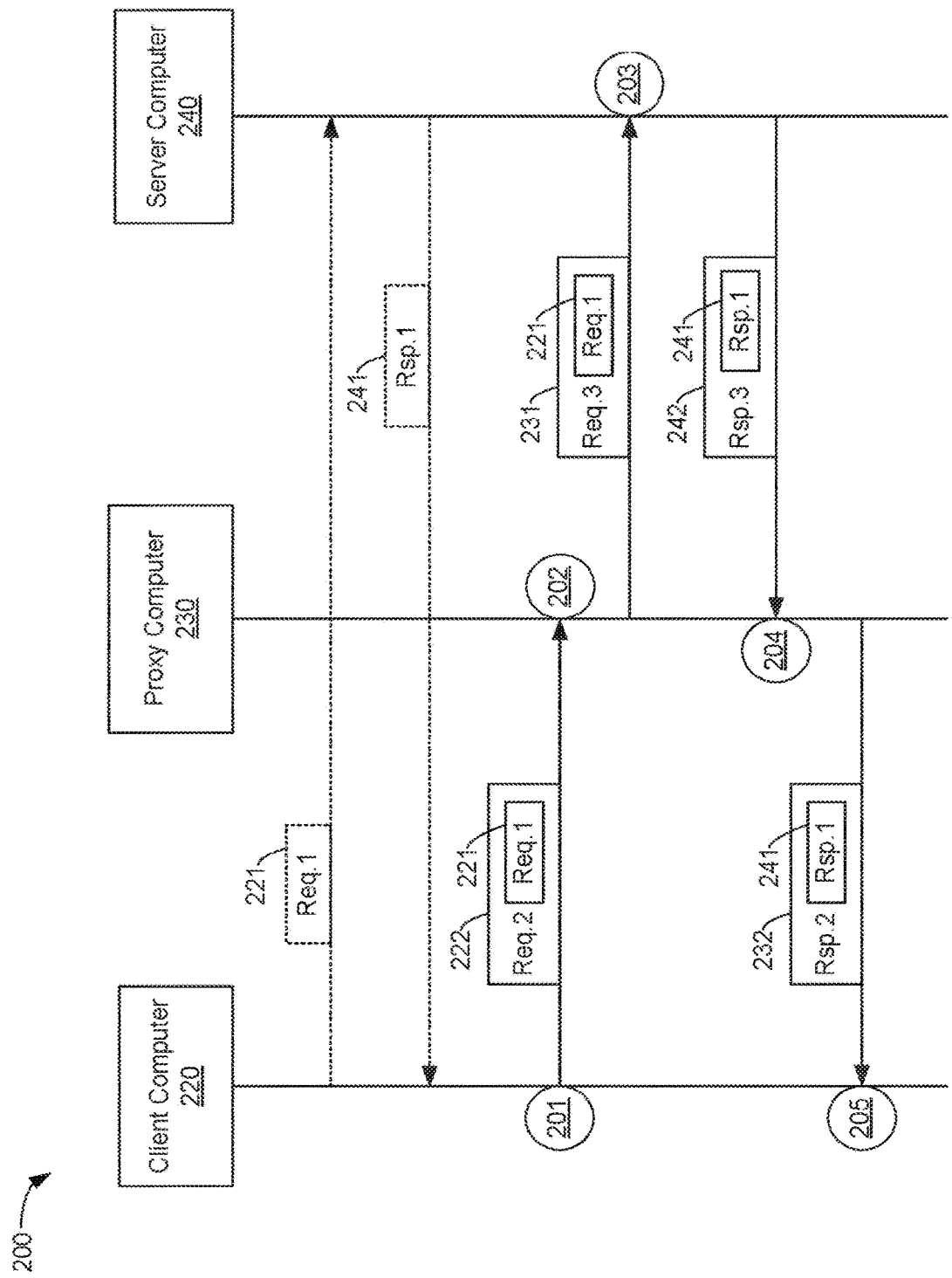
FIG. 2 is a message flow diagram of secure end-to-end communications between a client computer and a server computer via a proxy computer, in accordance with some embodiments.

FIG. 2 is a message flow diagram 200 of secure end-to-end communications between a client computer 220 and a server computer 240 via a proxy computer 230, in accordance with some embodiments. The client computer 220 may communicate with the server computer 240 over a first secure channel via a second secure channel with the proxy computer 230. The client computer 220 may have previously established both the second secure channel with the proxy computer 230 and the first secure channel with the server computer 240. The proxy computer 230 may have previously established a third secure channel with the server computer 240.

In the message flow diagrams herein, dotted/dashed lines and objects are optional. The circles in the message flow diagrams indicate steps ordering of steps or processes being performed by certain computers or devices. In other embodiments, certain steps may be performed in a different order.

Conceptually, secure end-to-end communications between the client computer 220 and the server computer 240 involve generating a first request message 221, encrypting the first request message 221 using a first session key that is shared with the server computer 240, and sending the first request message 221 to the server computer 240 over a first secure channel (e.g., using the first session key). The first request message 221 may be routed through the proxy computer 230 (e.g., via a second secure channel between the client computer 220 and the proxy computer 230 and via a third secure channel between the proxy computer 230 and the server computer 240). However, the proxy computer 230 may not decrypt the first request message 221 (e.g., because the proxy computer 230 does not have the first session key).

At the server computer 240, secure end-to-end communications with the client computer 220 involves receiving the first request message 221 that was sent by the client computer 220, decrypting the first request message 221, processing the first request message 221 (e.g., generating or obtaining data requested in the first request message 221), generating a first response message ("Rsp.1" in FIG. 2) 241, encrypting the first response message using the first session key, and sending the first response message 241 to the client computer 220 over the first secure channel. The first response message 241 may be routed through the proxy computer 230. However, the proxy computer 230 may not decrypt the first response message 241. The client computer 220 can receive and decrypt the first response message 241 to obtain the requested data, if any.

As such, the client computer 220 and the server computer 240 can secure exchange the first request message 221 and the first response message 241 over the first secure channel without these messages being decrypted by the proxy computer 230.

In order to achieve secure end-to-end communications with the server computer 240 via the proxy computer 230, the client computer can wrap the first request message 221 in a second request message 222 and use a different channel (e.g., different encryption keys) for communications with the proxy computer 230.

At 201, the client computer 220 can generate the first request message 221 and encrypt it using the first session key that is shared with the server computer 240. For example, the first request message 221 include a request for specific data from the server computer 240. The client computer can then generate a second request message 222 ("Req.2" in FIG. 2), The second request message 222 may include the first request message 221. The second request message 222 can request the proxy computer 230 to route (e.g., send) the first encrypted request message 221 to the server computer 240. For example, the second request message 222 can have a message body that includes address information for the server computer 240 (e.g., an address or route). The client computer 220 can encrypt the second request message 222 using a second session key that is shared with the proxy computer 230.

In some embodiments, encrypting the second request message 222 involves encrypting the message body of the second request message 222 using the second session key but not re-encrypting the first request message 221. That is, the first request message 221 may be sent in a cleartext portion of the second request message 222. It may be secure to include the first request message 221 as cleartext because the first request message 221 is already encrypted using the first session key. Then, the client computer 220 can send the second request message 222, which includes the first encrypted request message 221, to the proxy computer 230 over a second secure channel (e.g., the second channel is secured using encryption based on the second session key). The proxy computer 230 can receive the second request message 222 from the client computer 220 over the second secure channel.

At 202, the proxy computer 230 can decrypt the second request message 222 using the second session key, which is shared with the client computer 220. That is, the proxy computer 230 can decrypt the message body of the second request message 222. However, the first request message 221 is encrypted using the first session key, which is not shared with the proxy computer 230. Therefore, the proxy computer 230 cannot decrypt the first request message 221 that is included with the second request message 222.

The proxy computer 230 can parse the message body of the second request message 222 to identify the address information for the server computer 210. Then the proxy computer 230 can generate a third request message 231 ("Req.3" in FIG. 2). The first request message 221 can be included in the third request message 231. The proxy computer 230 can encrypt it the third request message 231 using a third session key that is shared with the server computer 240. In some embodiments, encrypting the third request message 231 involves encrypting a message body of the third request message 231 using the third session key but not re-encrypting the first request message 221. That is, the first request message 221 may be sent in a cleartext portion of the third request message 231.

The proxy computer 230 can then route the third request message 231 to the server computer 240 over a third secure channel (e.g., using the third encryption key) established between the proxy computer 230 and the server computer 240. The server computer 240 can receive the third request message 231 from the proxy computer 230 over the third secure channel. In response to receiving the third request message 231, at 203 the server computer can decrypt the third request message 231 using the third session key, which is shared with the proxy computer 230. The server computer 240 can then decrypt the first request message 221 using the first session key, which is shared with the client computer 220.

The server computer 240 can process the first request message 221. In processing the first request message 211, the server computer 240 may determine the information or action requested by the client computer 220. The server computer 240 may obtain the requested information or perform the requested action. The server computer can then generate a first response message 241 ("Rsp.1" in FIG. 2) for the client computer 220. In some embodiments, the first response message 241 can include the information requested by the client computer 220. In some embodiments, the first response message 241 can indicate that the server computer 240 performed the requested action. The server computer 240 encrypts the first response message 241 using the first session key that is shared with the client computer 220.

The server computer then generates a third response message 242 ("Rsp.3" in FIG. 2) for the proxy computer 230. The third response message 242 can include the first response message 241, which is encrypted using the first session key. The third response message 242 is responsive to the third request message 231 from the proxy computer 230 and the first response message 241 is responsive to the first request message 221 from the client computer 220. The server can encrypt the third response message 242 using the third session key that is shared with the proxy computer 230. In some embodiments, encrypting the third response message 242 involves encrypting a message body of the third response message 242 using the third session key but not re-encrypting the first response message 241. That is the first response message 241 may be sent in a cleartext portion of the third response message 242. The message body of the third response message 242 may include address information for the client computer 220 (e.g., an address of the client computer 220 or a route to the client computer 220). The server computer 240 can send the third response message 242 including the first response message 241 to the proxy computer 230 over the third secure channel.

The proxy computer 230 can receive the third response message 242 from the server computer 240. At 204, the proxy computer 230 can decrypt the third response message 242 using the third session key, which is shared with the server computer 240. That is, the proxy computer 230 can decrypt the message body of the third response message 242. However, the first response message 241 is encrypted using the first session key, which is not shared with the proxy computer 230. Therefore, the proxy computer 230 cannot decrypt the first response message 241 that is included in the third response message 242.

The proxy computer 230 can parse the message body of the third response message 242 to identify the address information for the client computer 220. Then the proxy computer 230 can then generate a second response message 232 ("Rsp.2" in FIG. 2). The first response message 241 can be included in the second response message 232. The second response message 232 is responsive to the first request message 221. The proxy computer 230 can encrypt it the second response message 232 using the second session key that is shared with the client computer 220. In some embodiments, encrypting the second response message 232 involves encrypting a message body of the second response message 232 using the second session key but not re-encrypting the first response message 241. That is, the first response message 241 may be sent in a cleartext portion of the second response message 232. The proxy computer 230 can then route the second response message 232 to the client computer 220 over the first secure channel with the client computer 220.

The client computer 220 can receive the second response message 232 from the proxy computer 230 over the first secure channel. At 205, in response to receiving the second response message 232, the client computer 220 can decrypt the second response message 232 using the second session key, which is shared with the proxy computer 230. The client computer 220 can then decrypt the first response message 241 using the first session key, which is shared with the server computer 240.

By using the secure channel established with the proxy computer 230, the client computer 220 can exchange secure communications with the server computer 240 even without a direct connection to the server computer 240. Furthermore, the communications between the client computer 220 and the server computer 240 cannot be decrypted by the proxy computer 230. Thus, the proxy computer 230 can provide routing for the client computer 220 even while the client computer 220 maintains the privacy of its communications.

In other embodiments, the second channel that is established between the client computer 220 and the proxy computer 230 may not be secured. For example, the client computer 220 and the proxy computer 230 may communicate over an unencrypted Wi-Fi connection, an unencrypted bluetooth connection, or a red connection. However, even if the second channel with the proxy computer 230 is not secured, the first request message 221 and the first response message 241 are still secure because they are encrypted using the first session key.

The client computer 220 can also ensure that communications with both the proxy computer 230 and the server computer 240 are confidential. The client computer 220 can establish a confidential and secure channel using a single request message and a single response message. For example, the client computer 220 can establish a shared secret for communicating with the server computer 240 using an ephemeral private key that is generated by the client computer 220 and a public key of the server computer 240. The client computer 220 can send, in a single request message, an ephemeral public key (which forms a key pair with the ephemeral private key) to the server computer 240 along with data that is encrypted using the shared secret. As such, the server computer 240 can generate the same shared secret using the ephemeral public key of the client computer 220 and a private key of the server computer 240 (which forms a key pair with the public key of the server computer). As such, the request message maintains the confidentiality of the client computer 220 because an ephemeral key may only be used once, and thus, cannot be tracked in the same way that a static public key can be tracked.

In some embodiments, instead of generating an ephemeral key pair for establishing the shared secret, the client computer 220 can blind its static public key using a blinding factor (e.g., a cryptographic nonce) and send the blinded public key to the server computer 240. The blinded public key also maintains the confidentiality of the client computer since the client computer's static public key cannot be derived without the blinding factor. In embodiments where the client computer 220 uses a blinded client computer public key to generate the shared secret, the client computer 220 can include the blinding factor in the encrypted data send to the server computer 240. The server computer 240 can generate the same shared secret using the blinded user device public key and the server computer's private key. This shared secret can be used to decrypt the encrypted data from the client computer 220, which can include the blinding factor.

The sever computer 240 can then authenticate the client computer 220 by regenerating the blinded client computer public key using the decrypted blinding factor and a client public key from a valid certificate of the client computer 220. Upon authenticating the client computer 220, the server computer 240 can generate a blinded server computer public key using the server computer public key and a second blinding factor (e.g., cryptographic nonce) that is generated by the server computer 240. The server computer 240 can generate a second shared secret using the client public key, the server computer private key, and the second blinding factor. The server computer 240 can then send a response message to the client computer 220 that includes the blinded server computer public key and data that is encrypted using the second shared secret. The encrypted data sent by the server computer 240 can include the second blinding factor that was generated by the server computer. As such the response message from the server computer 240 maintains confidentiality because the blinded server computer public key cannot be traced back to the server computer 240.

The client computer 220 can then generate the same second shared secret using the client computer private key and the blinded server computer public key. The client computer 220 can then decrypt the encrypted data in the response message. The client computer 220 can authenticate the server computer 240 by regenerating the blinded server computer public key using the second blinding factor and a public key of the server computer 240 from a valid certificate of the server computer 240.

Referring back to FIG. 2, the secure end-to-end communications between the client computer 220 and the server computer 240 may be made confidential through the process described above in addition the communications between the client computer 220 and the proxy computer 230 may also be made confidential.

For example, the client computer 220 can encrypt the first request message 221 using a first shared secret. The first shared secret can be established using either an ephemeral private key generated by the client computer 220 or a blinded client computer private key, as discussed above, and the server computer public key. The first request message 221 can include the corresponding public key (e.g., the corresponding ephemeral public key or the blinded client computer public key) and the data of the first request message 221 can be encrypted using the first shared secret. As such, the end-to-end communication with the server computer remains confide even while being routed by the proxy computer 230.

In addition, the second request message 222, which includes the first request message 221 can also be made confidential. The client computer 220 can encrypt the second request message 222 using a second shared secret. The second shared secret can be established using either a second ephemeral private key generated by the client computer 220 or a second blinded client computer private key (using a different blinding factor), and the public key of the proxy computer 230. The second request message 222 can include the corresponding public key (e.g., the corresponding second ephemeral public key or the second blinded client computer public key) and the data of the second request message 222 can be encrypted using the second shared secret.

Both the first response message 241 from the server computer 240 and the second response message 232 can be made confidential as discussed above. For example, the first response message 241 can include a blinded server computer public key and it can include data that is encrypted using another shared secret that was established using a blinding factor generated by the server computer. The second response message 232 can include a blinded proxy computer public key and it can include data that is encrypted using another shared secret that was establishing using a blinding factor that was generated by the proxy computer 230.

As such, the client computer 220 can send only a single request message (e.g., the second request message 222, which includes the first request message 221) and receive only a single response message (e.g., the second response message 232, which includes the first response message 241) in order to establish a confidential and secure end-to-end communication channel with the server computer 240 via a second confidential and secure end-to-end communication channel with the proxy computer 230. Such confidential and secure communications using only a single request message and a single response message are advantageous because they enable the client computer 220 to have secure communications with the server computer 240 while also maintaining the privacy of both the client computer 220 and the server computer 240 without sending additional hand-shake communications to establish the private and secure channel.

III. Secure Multi-Party Communications Using a Single Multi-Party Message

A proxy computer can process requests and response communications between many different source and destination computers. As such, numerous messages can pass through the proxy computer. In order to reduce the number of messages being transferred through the proxy computer, thereby reducing routing complexity and the use of networking resources, multiple source-messages may be combined into a single multi-parts message that is transferred to the proxy computer for routing.

The multi-party message can contain address information for each of the source-messages. The address information can indicate a networking address or a route to the destination of the source-message. Thus, the proxy computer can receive a single multi-party message including multiple source-messages and route each of the source messages to their destination based on the address information included in the single multi-party message. In some embodiments, each of the source-messages can be encrypted using a session key that is shared with their respective destination, but not with the proxy computer. As such, each of the source-messages included in the multi-party message can be separately secured end-to-end over their own respective communication channel. Thus, multiple secure end-to-end communication channels can be provided using a single multi-party message, thereby reducing routing complexity and the amount of messages being transferred.

Figure 3:
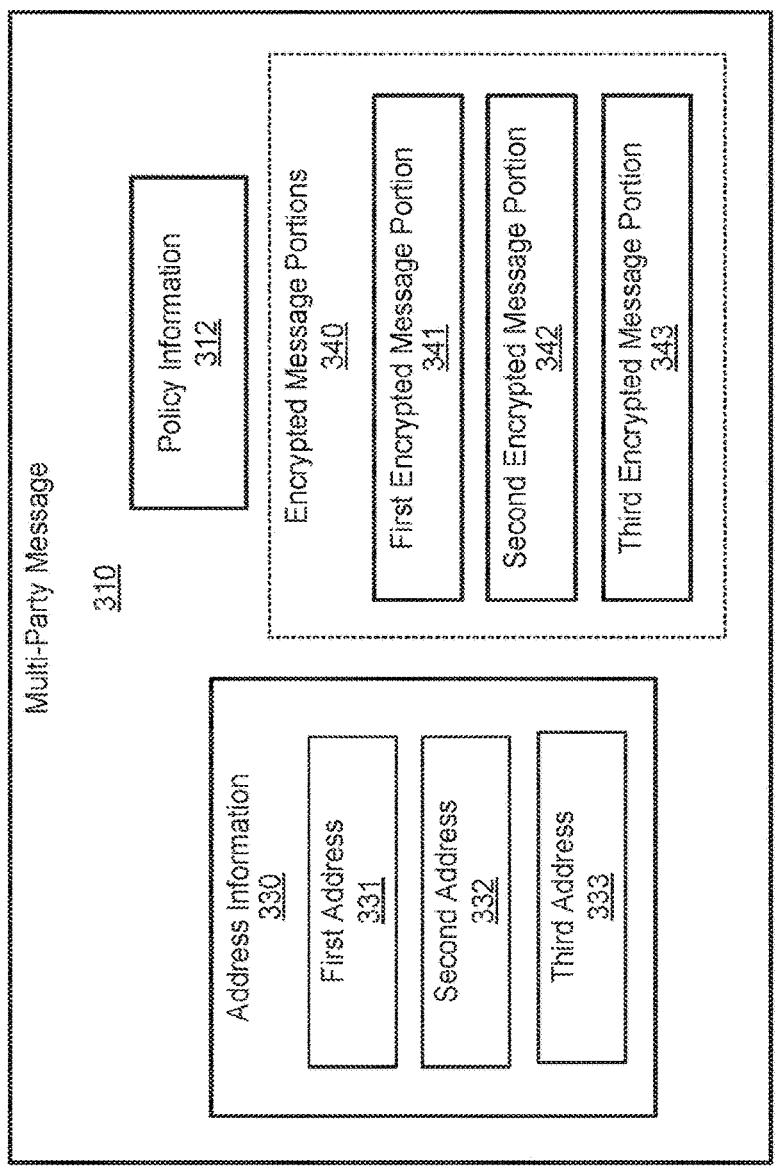
FIG. 3 is a block diagram of a multi-party message including a plurality of encrypted message portions and address information for routing each of the plurality of encrypted message portions, in accordance with some embodiments.

FIG. 3 is a block diagram 300 of a multi-party message 310 including a plurality of encrypted message portions 340 and address information 330 for routing each of the plurality of encrypted message portions, in accordance with some embodiments. As described herein, a source computer may generate the multi-party message 310 in order to send different data to different recipient computers. The multi-party message 310 may be implemented in secure communications between a client computer and a sever computer, via a proxy computer, as discussed above with respect to FIG. 2.

In order to generate the multi-party message 310, the source computer may identify a plurality of recipient computers. In some embodiments, the plurality of recipient computers are different computers. In some embodiments, the plurality of recipient computers are the same computer. In some embodiments, the plurality of recipient computers are different applications running on the same computer, or running on different computers. For example, a source computer can identify a first recipient computer, a second recipient computer, and a third recipient computer. The source computer may determine address information 330 for each of the plurality of recipient computers, the address information indicating a route to each recipient computer, respectively. For example, the source computer may determine a first address 331 for the first recipient computer, a second address 332 for the second recipient computer, and a third address 333 for the third recipient computer.

The source computer can obtain an encrypted message portion for each of the plurality of recipient computers. For example, the source computer can obtain a first encrypted message portion 341 for the first recipient computer, a second encrypted message portion 342 for the second recipient computer, and a third encrypted message portion 343 for the third recipient computer. Each of the encrypted message portions 340 may be encrypting using a session key that is shared with the corresponding recipient computer. For example, the first encrypted message portion 341 may be encrypted using a first session key that is shared with the first recipient computer (e.g., the first recipient computer may establish or obtain the first session key use it to decrypt the first encrypted message portion 341). In some embodiments, the source computer that generates the multi-party message 310 may encrypt a first message portion using the first session key to obtain the first encrypted message portion 341. In other embodiments, the source computer that generates the multi-party message 310 may receive the first encrypted message portion 341 from a second source computer. The second source computer may have encrypted the first message portion using the first session key. Likewise, the second encrypted message portion 342 may be encrypted using a second session key that is shared with the second recipient computer and the third encrypted message portion 343 may be encrypted using a third session key that is shared with the third recipient computer. Thus, each of the encrypted message portions 340 may be separately secured such that they can only be accessed by their intended recipient computer. As such, the multi-party message 310 established secure end-to end communications between the first source computer and the first recipient computer, between the second source computer and the second recipient computer, and between the third source computer and the third recipient computer.

Each of the encrypted message portions 340 may be routed to each of the recipient computer based on the corresponding address information 330. For example, the first encrypted message portion 341 can be routed to the first recipient computer using the first address 331. Likewise, the second encrypted message portion 342 can be routed to the second recipient computer using the second address 332. And the third encrypted message portion 343 can be routed to the third recipient computer using the third address 333.

The multi-party message 310 may also include policy information 312 for the multi-party message 310. The policy information 312 can indicate how to process, and whether to process, the multi-party message 310 and the encrypted message portions 340. For example, the policy information 312 may indicate a certain date on which the multi-party message 310 is valid. If the multi-party message 310 is determined to be invalid based on the policy information 312 (e.g., the multi-party message 310 is received after the date specified in the policy information 312), then the encrypted message portions 340 may not be distributed to any of the plurality of recipient computers. The policy information 312 may also indicate a certain or time period within which the multi-party message 310 is valid.

Processing the multi-party message 310 based on the policy information 312 may be advantageous in situations where the recipient computers are asynchronous (e.g., the recipient computers have intermittent network connectivity). In some embodiment, some or all of the encrypted message portions 340 may have their own policy information indicating how the respective message portion should be processed.

In other embodiments, the multi-party message 310 may include a different number of encrypted message portions 340. Accordingly, the multi-party message 310 would include the name number of addresses in the address information 330 For example the multi-party message 310 can include two encrypted message portions, ten encrypted message portions, or another number of encrypted message portions. In some embodiments, one or more of the encrypted message portions may itself be a multi-party message (when decrypted). Thus, multi-party messages may be nested within other multi-party messages.

The source computer may send the multi-party message 310 to a proxy computer. The proxy computer may distribute the encrypted message portions 340 to each of the recipient computers, based on the address information 330, without decrypting the encrypted message portions 340. In some embodiments, the source computer may encrypt the multi-party message 310 using a proxy session key that is shared with the proxy computer. In such embodiments, the proxy computer may establish or obtain the proxy session key, which is shared with the source computer, and the proxy computer may decrypt the multi-party message using the proxy session key.

Using a multi-party message 310 that aggregates multiple source messages can be advantageous in numerous different situations. For example, the multi-party message 310 can provide an efficient way to encrypt multiple channels using a single request message (e.g., a single multi-party request message) and a single response (e.g., a single multi-patty response message). As such, the multi-party messages can act as a multicast message to the plurality of recipient computers while maintaining security (e.g., because the encrypted message portions are separately secured using different encryption keys for the respective recipient computer).

In some embodiments, a source device may have data that is intended for different recipient computers. The source device can encrypt each of the source messages using a session key that is shared with the corresponding destination computer and then aggregate the encrypted source messages into a single multi-party message. Then, the source computer can send the single multi-party message to a proxy computer, which will appropriately route each of the source messages to their respective destination, without decrypting the contents of arty source message into cleartext.

In another embodiment, a source computer may operate a number of different applications and source messages from each application can be separately encrypted (e.g., using different encryption keys) and included in a single multi-party message. In another embodiment, a hub computer may aggregate a plurality of request messages received from multiple devices in a personal device network (e.g., an internet of things device network) into a single multi-party request message. In another embodiment, a server that processes a plurality of request messages may aggregate a plurality of corresponding response messages into a single multi-party response message. In some embodiments, multi-party message can be nested, such that one multi-party request message includes a plurality of source-messages where one or more of the source-message is a multi-party message itself. Exemplary embodiments are described in further detail below.

A. Multi-Party Communications From Multiple Source Computers to a Single Recipient Computer Embodiments described herein can provide an efficient way to encrypt multiple channels using a single multi-party message. For example, a plurality of source devices in a personal device network may lack network connectivity to a server computer that provides data or devices to the source devices. Such source devices may be a smart watch which has near-field communication capabilities, or bluetooth capability, but not Internet connectivity. This device may connect to a hub computer, such as a mobile phone, that can provide connectivity to the server computer. The hub computer provide interact connectivity for a plurality of devices in the personal device network. In order to reduce complexity, the hub computer can aggregate a plurality of request messages from a plurality of source computers in the personal device into a single multi-party message that is sent to a proxy computer for distribution to the server computer. The plurality of request messages may each be encrypted using a different session key and included in the multi-party message as encrypted message portions. As such, communication complexity is reduced in that a single multi-party request message is sent to the proxy computer instead of sending multiple request messages for each source computer. Furthermore, security and privacy are ensured since different session keys can be used to encrypt the different encrypted message portions.

Figure 4:
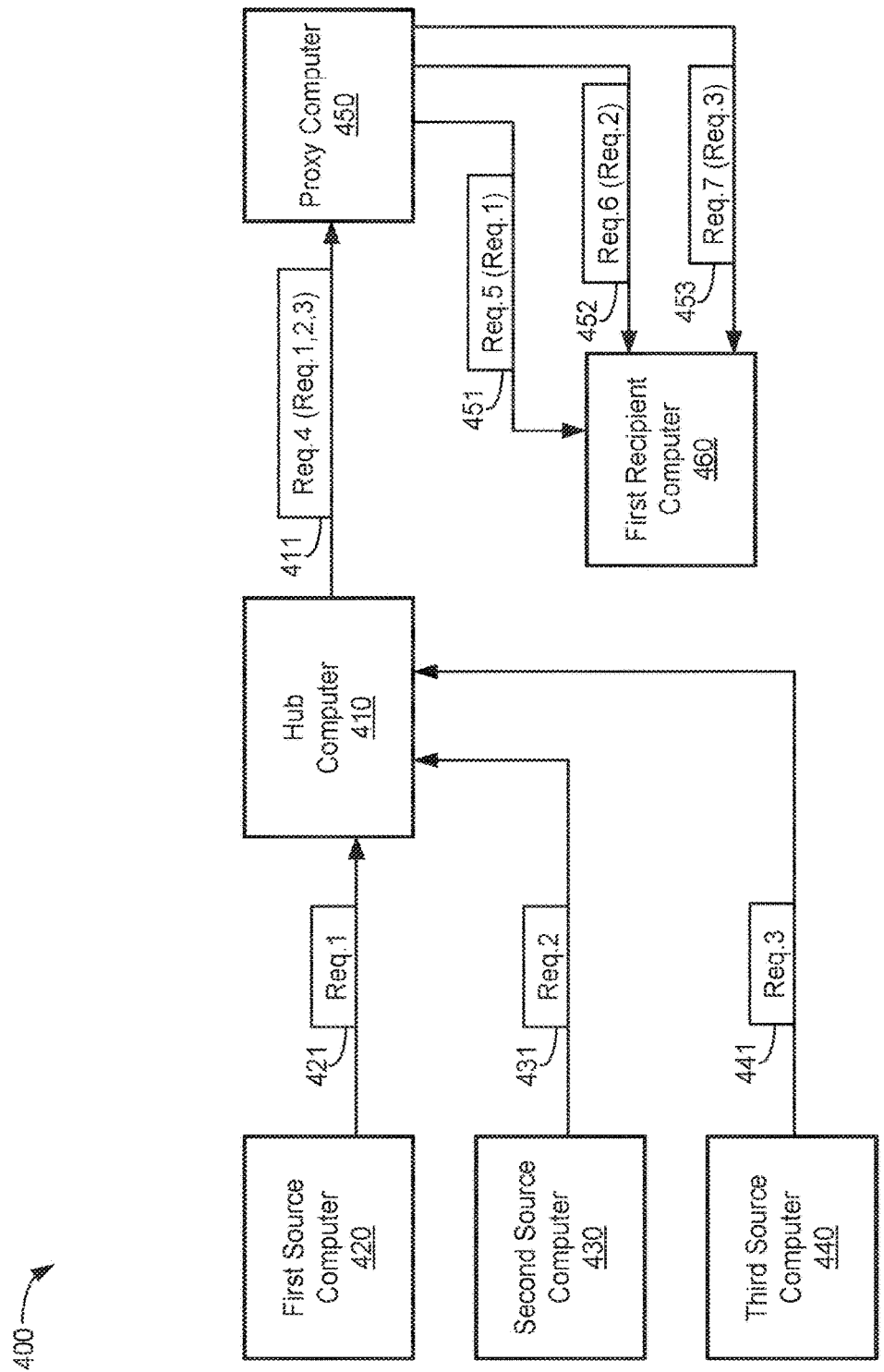
FIG. 4 is a message flow diagram of a hub computer receiving and aggregating plurality of request messages into a single multi-party message that is sent to a proxy computer for distribution to a first recipient computer, in accordance with some embodiments.

FIG. 4 is a message flow diagram 400 of a hub computer 410 receiving and aggregating a plurality of request messages into a single multi-party message that is sent to a proxy computer 450 for distribution to a first recipient computer 460, in accordance with some embodiments. This message flow may be used for aggregating request messages from a plurality of source computers (e.g., client computers) that do not have network capability (e.g., devices in a personal device network or in an "interact of things" network). The messages may be aggregated into a multi-party message as discussed above with respect to FIG. 3. The hub computer 410 may provide network connectivity to a first source computer 420, a second source computer 430, and a third source computer 440. In addition, the message flow of FIG. 4 may implement secure end-to-end communications and discussed above with respect to FIG. 2. The first recipient computer 460 may be a service provider computer that provides services to the source computers. The services provided by the service provider can be any suitable information or data. For example, where the source computers are "internet of things" devices within a home, the service provider computer can store credentials that can be provided to the devices, or the service provider can store data for the devices, process that data, and provide the data to the devices upon request.

In this embodiment, each of the source computers may send a request message to the first recipient computer 460. The first source computer 420 can generate a first request message 421 ("Req. 1" in FIG. 4). The first source computer 420 can encrypt the first request message 421 using a first session key that is established with the first recipient computer 460. For example, the first session key may be established using a private key of the first source computer and a public key of the first recipient computer. The first source computer 420 can send the first request message 421 to the hub computer 410. The hub computer 410 can generate a multi-party request message and include the first request message 421 (which is encrypted using the first session key) as an encrypted message portion of the multi-party request message.

The hub computer 410 can also include encrypted message portions for requests from the second source computer 430 and the third source computer 440. For instance, the second source computer 430 can encrypt a second request message 431 ("Req.2" in FIG. 4) using a second session key that is established with the first recipient computer 460. For example, the second session key may be established using a private key of the second source computer and a public key of the first recipient computer. The second source computer 430 can send the second request message 431 to the hub computer 410. The third source computer can encrypt a third request message 441 ("Req.3" in FIG. 4) using a third session key that is established with the first recipient computer 460. For example, the third session key may be established using a private key of the third source computer and a public key of the first recipient computer. The third source computer 440 can send the third request message 441 to the hub computer 410.

After receiving encrypted request messages from each of the source computers, the hub computer can include each of the encrypted request messages in a fourth request message 411 as encrypted message portions of a multi-party message. The hub computer 410 can also determine address information for each of the encrypted message portions (e.g., the first request message 421, the second request message 431 and the third request message 441). The address information can indicate an address of, or route to, the recipient computer. In this embodiment, the three request messages are being sent to the first recipient computer 460. Accordingly, the address for each of the encrypted message portions would indicate an address of, or route to the first recipient computer 460.

The hub computer 410 can send a fourth request message 411 ("Req.4(Req.1,2,3)" in FIG. 4) to the proxy computer 450. As discussed above, the fourth request message 411 from the hub computer 410 is a multi-party message including encrypted message portions for the first request message 421, the second request message 431, and the third request message 441. In some embodiment, the hub computer can encrypt the fourth request message 411 using a proxy session key that is established between the hub computer 410 and the proxy computer 450. For example, the message body, which includes the address information, may be encrypted using the proxy session key. In some embodiments, the encrypted message portions may be encrypted using the proxy session key. In some embodiments, the encrypted message portions may not be encrypted using the proxy session key (e.g., the encrypted message portions may be sent in a clear text portion of the fourth request message, while still being encrypted by their respective session keys).

The proxy computer 450 can receive the fourth request message 411 from the hub computer 410. In embodiments where the fourth request message 411 is encrypted using the proxy session key, the proxy computer can decrypt the fourth request message 411 the using proxy session key. For example, the proxy session key may be generated using a private key of the proxy computer 450 and a public key of the hub computer 410.

The proxy computer can obtain the address information within the message body of the fourth request message 411. The proxy computer 450 can parse the address information to identify an address for each of the encrypted message portions. In this embodiment, the proxy computer 450 can determine that each of the three encrypted message portions are to be routed to the first recipient computer 460. The proxy computer 450 can then route each of the encrypted message portions to the first recipient computer 460. For example, the proxy computer 450 can generate a fifth request message 451 that includes the first encrypted message portion for the first request message 421 and send the fifth request message 451 to the first recipient computer 460. In addition, the proxy computer 450 can generate a sixth request message 452 that includes the second encrypted message portion for the second request message 431 and send the sixth request message 452 to the first recipient computer 460. And, the proxy computer 450 can generate a seventh request message 453 that includes the third encrypted message portion for the third request message 441 and send the seventh request message 453 to the first recipient computer 460.

Using the message flow of FIG. 4, the hub computer 410 can send a single multi-party response message (e.g., the fourth request message 411) to the proxy computer 450 instead of sending three different request messages separately, thereby reducing the complexity of the communications between the hub computer 410 and the proxy computer 450.

B. Multi-Party Communications from to Multiple Recipient Computers

Multi-party messages can also be used to send a message to multiple recipient computers. As discussed above with respect to FIG. 4, multiple source devices can send request messages to a server in a single multi-party request message. The server can respond to each of those request message in a multi-party response message. The proxy computer that provided the request messages to the server can be used to aggregate the response messages into a single multi-party response message. This single multi-party response message can be sent back to the hub computer that aggregated the request messages from the source devices. The hub computer can act as a proxy and distribute each separate response message (e.g., each encrypted message portion) to the intended recipients (e.g., a response is sent to the source computer that sent the corresponding response, where the source of the request is now the recipient of the response). Thus, a one-to-many response message can be made in response to a many-to-one request message.

Figure 5:
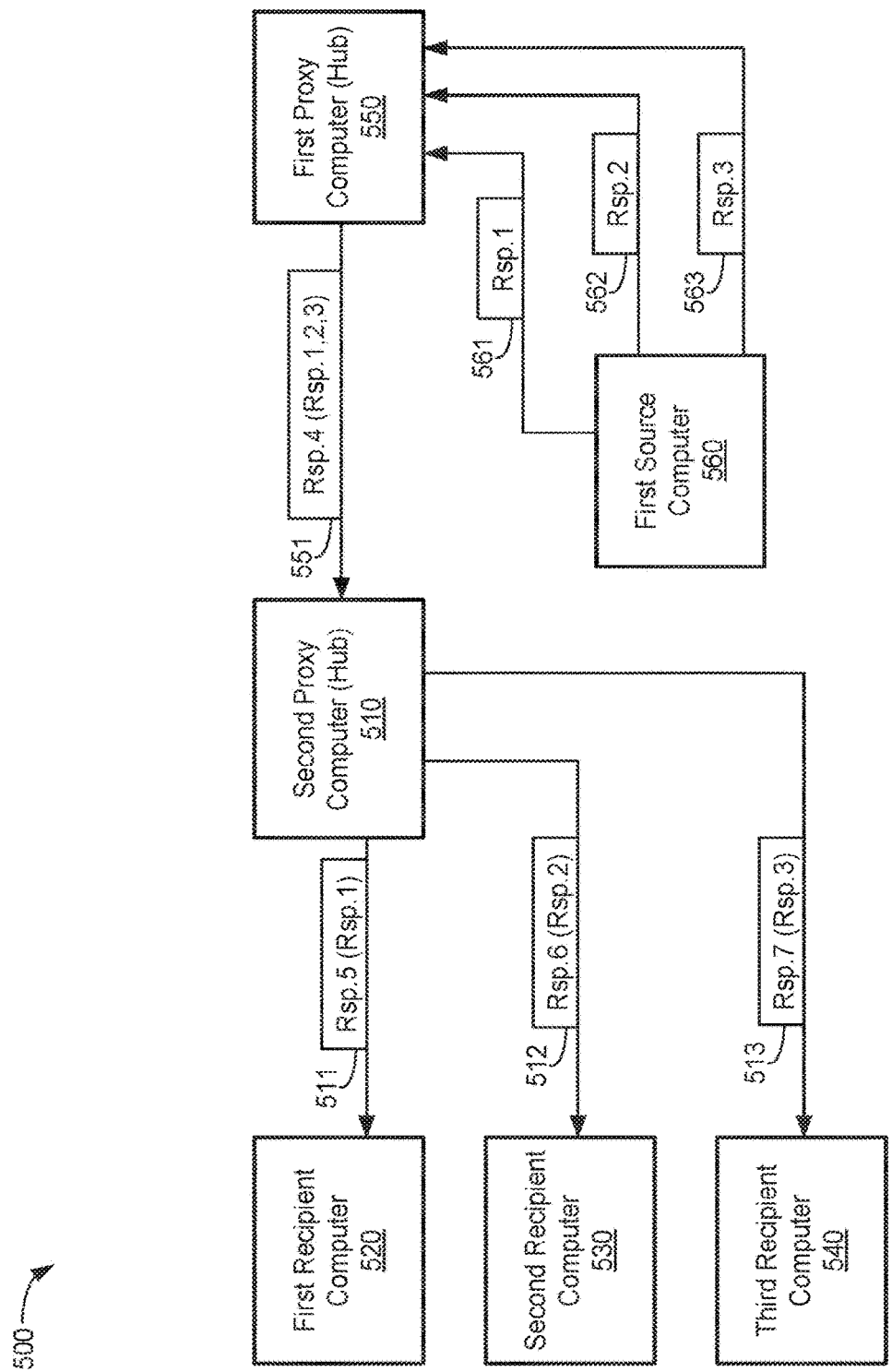
FIG. 5 is a message flow diagram of a first proxy computer receiving and aggregating a plurality of response messages into a single multi-party message that is sent to a second proxy computer for distribution to multiple recipient computers, in accordance with some embodiments.

FIG. 5 is a message flow diagram 500 of a first proxy computer 550 receiving and aggregating a plurality of response messages into a single multi-party message that is sent to a second proxy computer 510 for distribution to multiple recipient computers, in accordance with some embodiments. In this embodiment, the first source computer 560 may have previously received a first request message from a first recipient computer 520, a second request message from a second recipient computer 530, and a third request message from a third recipient computer 540. The first source computer (e.g., a server computer) may generate response messages in response to those request messages.

The first source computer 560 can generate a first response message 561 ("Rsp.1" in FIG. 5) in response to the first request message, a second response message 562 ("Rsp.2" in FIG. 5) in response to the second request message, and a third response message 563 ("Rsp.3" in FIG. 5) in response to the third request message. The first response message 561, the second response message 562, and the third response message 563 can be sent to a first proxy computer 550. The first proxy computer may act as a hub and aggregate the three response messages into a fourth response message 551 ("Rsp.4(Rsp.1,2,3)" in FIG. 5), which is a single multi-party response message with each of the response messages being separate encrypted message portions within the fourth response message 551. In some embodiments, the first source computer 560 may encrypt the response messages before sending them to the first proxy computer 550. In other embodiments, the first proxy computer 550 may encrypt the response messages itself. The fourth response message 551 can contain address information within a message body of the fourth response message 551 that indicates that the first response message 561 is for the first recipient computer 520, that the second response message 562 is for the second recipient computer 530, and that the third response message 563 is for the third recipient computer 540.

The first proxy computer 550 can send the fourth response message 551 to the second proxy computer 510. The second proxy computer 510 may have acted as a hub computer for the source computers that sent the requests to the first source computer 560 (which was the recipient computer in that message flow). In some embodiments the fourth response message 551 may be encrypted using a proxy session key that is established between the first source computer 560 and the second proxy computer 510.

The second proxy computer 510 can receive and decrypt the fourth response message 551. The second proxy computer 510 can then obtain the address information within the message body of the fourth response message 551. The second proxy computer 510 can parse the address information to identify an address for each of the encrypted message portions. In this embodiment, the second proxy computer 510 can determine that the three encrypted message portions are to be routed, respectively, to the first recipient computer 520, the second recipient computer 530 and the third recipient computer 540. The second proxy computer 510 can then route each of the encrypted message portions accordingly.

In this embodiment, the second proxy computer 510 can generate a fifth response message 511 ("Rsp.5(Rsp.1)" in FIG. 5) that includes the first encrypted message portion (which includes the first response message 561) and send the fifth response message 511 to the first recipient computer 520. The second proxy computer 510 can also generate a sixth response message 512 ("Rsp.6(Rsp.2)" in FIG. 5) that includes the second encrypted message portion (which includes the second response message 562) and send the sixth response message 512 to the second recipient computer 530. And, the second proxy computer 510 can generate a seventh response message 513 ("Rsp.7(Rsp.3)" in FIG. 5) that includes the third encrypted message portion (which includes the third response message 563) and send the seventh request message 514 to the third recipient computer 540.

As such the three response messages from the first source computer 560 can be routed to multiple recipient computers using a multi-party response message (e.g., the fourth response message 551). The message flows of FIG. 4 and FIG. 5 are advantageous because together they enable multiple request messages from multiple devices to be responded to using a single multi-party request message from the hub computer 410 to the proxy computer 450 and a single multi-party response message from the first proxy computer 550 (e.g., the proxy computer 450) to the second proxy computer 510 (e.g., the hub computer 410).

These message flows are advantageous in Internet of Things and personal device networks where data from multiple source devices can aggregated by the hub computer, which could be a mobile phone, or a gateway. The hub computer can wait for all the source devices to participate, aggregate the data into a multi-party message, and then send all of the data together to the proxy computer as a request. The request messages within the multi-party message can be distributed by the proxy computer to their intended recipients (e.g., servers or recipient computers).

The message many-to-one message flow described above is advantageous because it enables each individual source device to send a private and secure message, end-to-end, to the target service, which is behind the proxy. Thus, independent secure channels can established between each source device and the server or recipient computer using only a single multi-party request and one multi-party response back from the server. This reduces complexity compared to sending numerous smatter messages, ensures consistency in the way the communication process is handled and reduces communications for security handshakes.

Another advantage is that for asynchronous devices, the hub computer can wait for devices to show up, and when all the devices have responded, send the multi-party request. When the response comes back, you can wait for all the devices to come online, or the devices near the phone can show up one by one and the phone will independently transfer the message back to the devices, independently from whether the devices can connect to the service or not.

In another embodiment, a single source computer may have different pieces of data that can be encrypted differently, based on different encryption requirements or use cases. In this embodiment, a single multi-party message could include each of the different pieces of encrypted data.

In another embodiment account numbers can be encrypted in the encrypted message portions and a server can send multiple numbers to a proxy, which can then send out to individual devices. Thus, the server can process a file to use a different key for different account numbers, tokens, or other data to be sent to different devices. On the target side, if the target does not have the privilege that is necessary to see the actual account values, the target will only be able to decrypt the general file content, but not the account numbers. For that, a target needs access to a separate private key like an elliptical private key which is only granted to privileged entities. On the target, this might then be a specific application that's may be in a secure part of that server. Thus, after that initial general information is obtained, the proxy might then get information about how to route any message portions, and route it to the secure part of that server or other recipients. The secure port can generate its own session key decrypt the account numbers, and then be able to manipulate those account numbers. That part of that application that is in a secure area can be compliant with various security protocols.

C. Multi-Party Communications from Multiple Source Computers to Multiple Recipient Computers In some embodiments, there can multiple source computers, multiple recipient computers, and multiple proxy computers. In some embodiments, the proxy computers can be nested such that a multi-party messages is included as encrypted message portion within another multi-party message. Each proxy computer can decrypt an encrypted message to determine addresses of recipient devices to which encrypted message portions are to be forwarded. The proxy can decrypt a received encrypted message to determine the addresses using a first session key that corresponds to the sender of the received encrypted message. One of the addresses can correspond to another proxy, which is then to forward encrypted message portions to other devices. The proxy can then use a second session key, which corresponds to the other device, to encrypt the addresses to which the other device is to forward encrypted message portions. None of the proxies can read the encrypted message portions as none of them have access to the corresponding key.

Accordingly, new senders and new recipients can be involved in a data exchange at each step, as requests with responses can be mixed. For instance, multiple proxies can be found on the data exchange route and each proxy unwraps and rewraps the recipient(s) data for the next proxy address without compromising the end-to-end protection of the recipient data. The information for key establishment and privacy protection can be similar for requests and responses.

Figure 6:
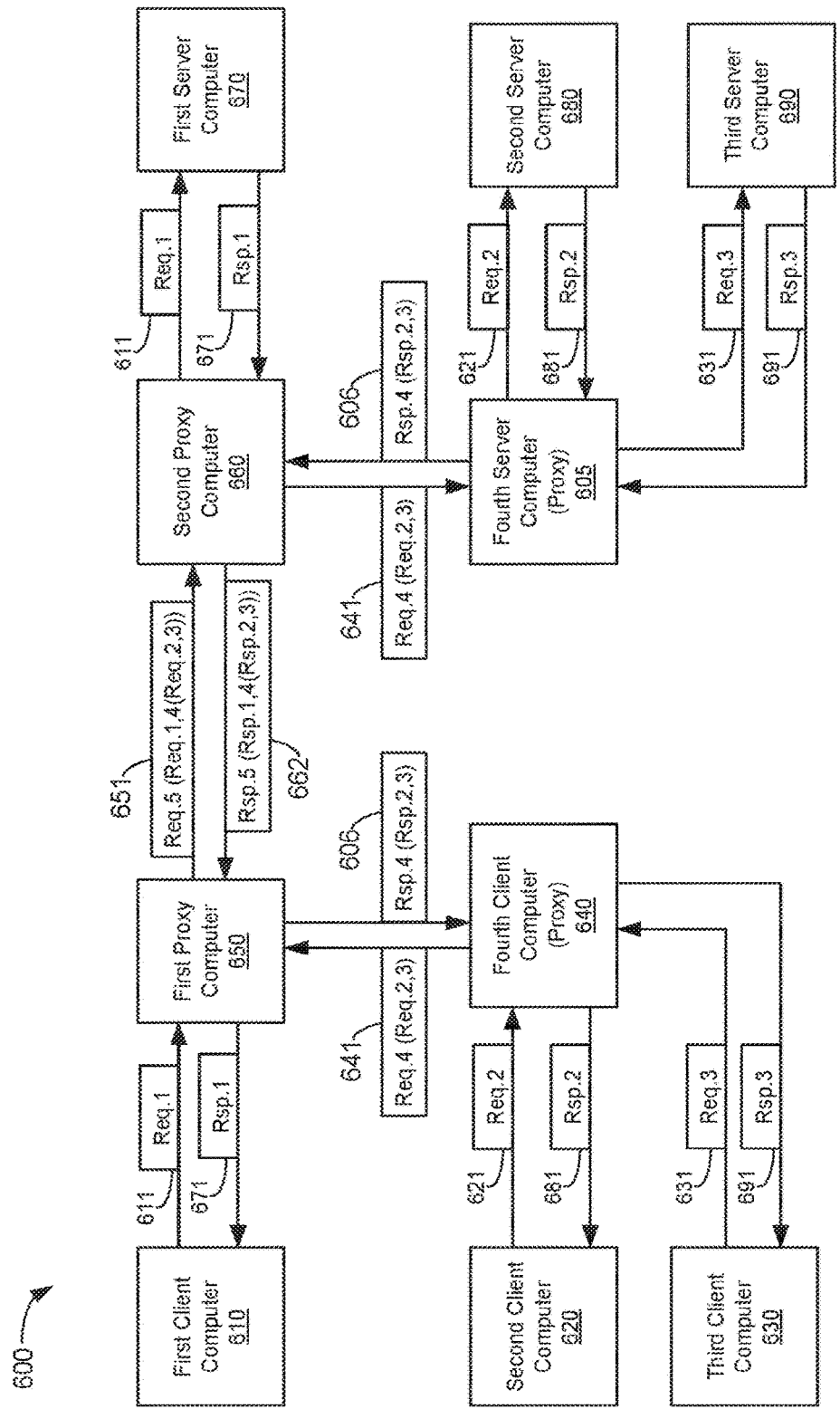
FIG. 6 is a message flow diagram of multi-party messaging between multiple source computers and multiple recipient computers in accordance with some embodiments.

FIG. 6 is a message flow diagram 600 of multi-party messaging between multiple source computers and multiple recipient computers, in accordance with some embodiments. The message flow of FIG. 6 expands upon the message flows of FIG. 4 and FIG. 5 by having communications between multiple sources and multiple recipients using multiple proxy computers such that multi-party messages are nested within other multi-party messages. In this embodiment, multiple client computers can send request messages to multiple server computers, which can response with response messages back to the client computers.

In this embodiment, a first client computer 610 sends a first request message 611 ("Req.1" in FIG. 6) to a first proxy computer 650 for distribution to a first server computer 670. A second client computer 620 sends a second request message 621 ("Req.2" in FIG. 6) to a fourth client computer 640, which acts as both a hub and as a proxy for the second client computer 620, for distribution to a second server computer 680. A third client computer 630 sends a third request message 631 ("Req.3" in FIG. 6) to the fourth client computer 640, which can also act as both a hub and as a proxy for the third client computer 630, for distribution to a third server computer 690. The fourth client computer 640 can generate a fourth request message 641 ("Req.4(2,3)" in FIG. 6) that is a multi-party request message including the second request message 621 and the third request message 631 as encrypted message portions. The fourth client computer 640 can then send the fourth request message 641 to the first proxy computer 650.

The first proxy computer 650 can generate a fifth request message 651 ("Req.5(Req.1,4(Req.2,3))" in FIG. 6) which is a multi-party request message including the first request message 611 and the fourth request message 641 (which is itself a multi-party request message including the second and third request messages) as encrypted message portions. The first proxy computer 650 can send the fifth request message to a second proxy computer 660 for distribution.

The second proxy computer can parse address information included in the fifth request message 651 to determine the address of each recipient computer. The second proxy computer 660 can send the encrypted message portion for the first request message 611 to the first server computer 670. The second proxy computer can then the fourth request message to a fourth server computer 605. The fourth server computer can then distribute the encrypted message portion for the second request message 621 to the second server computer 680 and the encrypted message portion to the third server computer 690.

Each of the server computers may process their corresponding request message and generate response messages. These response message may be aggregated into a multi-party response message as described above. In this embodiment, the first server computer generates a first response message 671 ("Rsp.1" in FIG. 6) and sends it to the second proxy computer 660, which may act as a hub for the server computers. The second server computer 680 generates a second response message 681 ("Rsp.2" in FIG. 6) and sends it to the fourth server computer 605. The third server computer generates a third response message 691 ("Rsp.3" in FIG. 6) and sends it to the fourth server computer 605.

The fourth server computer 605 can generate a fourth response message 606 ("Rsp.4(2,3)" in FIG. 6) that is a multi-party response message including the second response message 681 and the third response message 691 as encrypted message portions. The fourth server computer 605 can send the fourth response message 606 to the second proxy computer 660. The second proxy computer 660 can then generate a fifth response message 662 ("Rsp.5(Rsp.1, 4(Rsp.2,3))" in FIG. 6) which is a multi-party response message including the first response message 671 and the fourth response message 606 (which is itself a multi-party request message including the second and third response messages) as encrypted message portions. The second proxy computer 660 can send the fifth response message to the first proxy computer 650 for distribution to the client computers.

The first proxy computer 650 can parse address information included in the fifth response message 662 to determine the address of each recipient computer. The first proxy computer 650 can send the encrypted message portion for the first response message 671 to the first client computer 610. the first proxy computer 650 can send the fourth response message 606 to the fourth client computer 640. The fourth client computer 640 can parse address information included in the fourth response message 606 and send the encrypted message portion for the second response message

681 to the second client computer 620. The fourth client computer 640 cart send the encrypted message portion for the third request message 631 to the third client computer 630 based on the address information included in the fourth response message 606.

The message flow of FIG. 6 enables many-to-many messaging using only a single request message (e.g., the fifth request message 651) and a single response message (e.g., the fifth response message 662) between the first proxy computer 650 and the second proxy computer 660. The use of multi-party messages including encrypted message portions and address information for each of the encrypted message portions enables the reduced complexity described, above with respect to FIG. 6. Without multi-party messaging, three request message and three response messages would be transmitted instead of just one request and one response between the first proxy computer 650 and the second proxy computer 660.

IV. Authentication Using Multi-Party Messages

Figure 7:
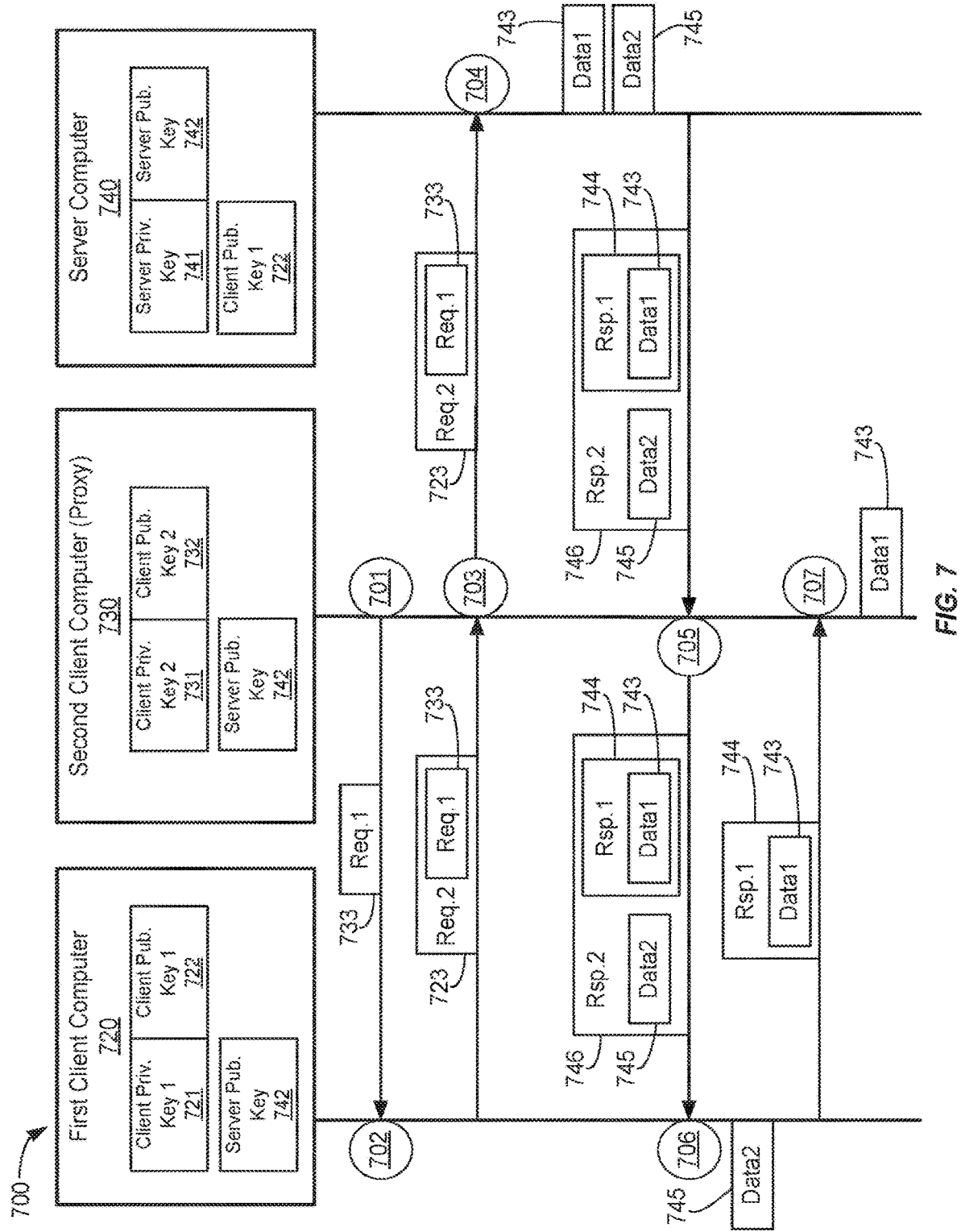
FIG. 7 is a message flow diagram of secure communications between a first client computer, a second client computer, and a server computer with authentication, in accordance with some embodiments.
Figure 8:
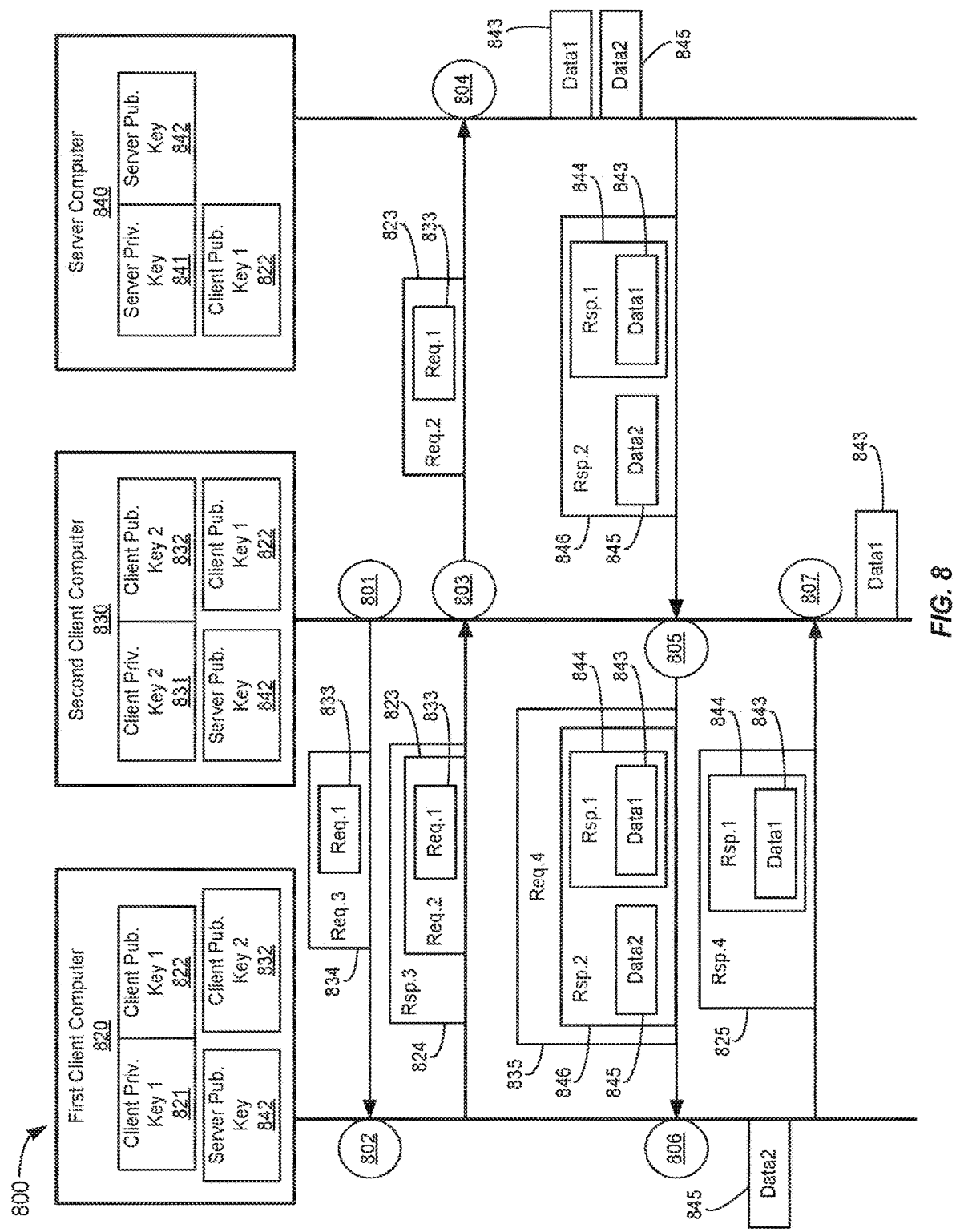
FIG. 8 is a message flow diagram of secure communications between a first client computer, a second client computer, and a server computer with dual channel protection, in accordance with some embodiments.

In some embodiments, multi-party messaging may also provide confidential authentication between the source computer and the recipient computer. FIGS. 7 and 8 show exemplary message flows for confidential authentication using multi-party messages. These message flows enable the server computer to provide different data to different client computers.

A. Secure Communications Between a First Client and a Server Computer

FIG. 7 is a message flow diagram 700 of secure communications between a first client computer 720, a second client computer 730, and a server computer 740 with authentication, in accordance with some embodiments. This message flow enables the first client computer 720 and the second client computer 730 to authenticate with the server computer 740 using a single multi-party request message sent to the server computer 740. After authentication, the server computer 740 can provide first data 743 ("Data1" in FIG. 7) to the second client computer 730 and second data 745 ("Data2" in FIG. 7) to the first client computer 720 another multi-party message. Thus, both the first client computer 720 and the second client computer 730 can be authenticated and receive different data from the server computer 740 using only one multi-party request message and one multi-party response message sent between the second client computer 730 and the server computer 740.

The first client computer 720 can store a first key pair including a first client private key 721 ("Client Priv. Key 1" in FIG. 7) and a first client public key 722 ("Client Pub. Key 1" in FIG. 7), which corresponds to the first client private key 721. The first client private key 721 can be an static private key and the first client public key 722 can be an static public key. In some embodiments, the first client computer 720 can generate the first client public key 722 using the first client private key 721. The first client computer can also store a server public key 742 ("Server Pub. Key in FIG. 7") of the server computer 740. The server public key 742 may be a static public key. In some embodiments, the first client computer 720 can be a smart watch that can directly communicate with the second client computer 730. In some embodiments the first client computer 720 may not have a communication path to the server computer 740 without the second client computer 730 acting as a proxy computer. In some embodiments the first client computer 720 may include a secure element circuit for secure data storage which can be used for strong authentication of the first client computer 720.

The second client computer 730 can store a second key pair including a second client private key 731 ("Client Priv. Key 2" in FIG. 7) and a second client public key ("Client Pub. Key 2" in FIG. 7). The second client private key 731 can be an ephemeral private key and the second client public key 732 can be an ephemeral public key. In some embodiments, the second client computer 730 can generate the second client private key 731 and use the second client private key 731 to generate the second client public key 732. The second client computer can also store the server public key 742 of the server computer 740. In some embodiments, the second client computer 730 can be a mobile phone that can directly communicate with the first client computer 720. In some embodiments, the second client computer 730 can act as a proxy computer for the first client computer 720 in that the second client computer 730 can route communications received from the first client computer 720 as described herein. In some embodiment, the second client computer 730 may not include a secure element circuit. In some embodiments, the second client computer 730 may implement host card emulation (HCE) software instead of using a secure element circuit. HCE may be less secure than a secure element and authentication based on HCE may be less strong than authentication based on a secure element.

The server computer 740 can store a third key pair including a server private key 741 ("Server Priv. Key" in FIG. 7) and the server public key 742. The server private key 741 may be a static private key and the server public key 742 may be a static public key. Prior to the communication flow of FIG. 7, the first client computer 720 and the second client computer 730 may have obtained the server public key 742. In some embodiments, the server computer 740 may trust the first client computer 720 but may not trust the second client computer 730. For example, the server computer 740 may trust a secure element of the first client computer 720 but may not trust HCE implemented on the second client computer 730. However, the server computer 740 may only be in communication with the second client computer 730 and may not be able to communicate with the first client computer 720 unless the second client computer 730 acts as a proxy computer for the first client computer 720.

At 701, the second client computer 730 can generate a first request message 733 that requests first data 743 from the server computer 740. The second client computer 730 can send the first request message 733 to the first client computer 720. In some embodiments, the second client computer 730 may send the first request message 733 using bluetooth communications or using near-field communications. In some embodiments, the second client computer 730 may send the first request message 733 to the first client computer 720 to be wrapped in a request message from the first client computer 720 because the first client computer 720 may be trusted by the server computer 740 and the second client computer 730 may not be trusted by the server computer 740. In some embodiments, the second client computer 730 and the first client computer 720 may trust each other because they may be within close proximity of one another (e.g., within a Bluetooth communication range or a near-field communication range).

In some embodiments, the second client computer 730 may encrypt the first request message 733 using a second session key that is for communicating with the server computer 740. The second client computer 730 may generate the second session key using the second client private key 731 and the server public key 742. The second client computer 730 may include the second client public key 732 in a cleartext portion of the first request message 733 (e.g., the second client public key 732 is in cleartext and it is not encrypted using the second session key).

At 702, the first client computer 720 can receive the first request message 733 from the second client computer 730. The first client computer 720 can generate a second request message 723 ("Req.2" in FIG. 7) for the server computer 740. The second request message 723 can request second data 745 ("Data2" in FIG. 7) from the server computer 740. The second request message 723 can include the first request message 733 that was received from the second client computer 730. In some embodiments, the first request message 733, which is included in the second request message 723, may be encrypted using the second session key.

In some embodiments, the first client computer 720 can generate a first session key that is for communicating with the server computer 740. The first client computer can generate the first session key using the first client private key 721, the server public key 742, and a first cryptographic nonce (e.g., a random number generated by the first client computer 720). In some embodiments, the first client computer 720 can encrypt the second request message 723 using the first session key. In some embodiments, the first client computer 720 may generate a blinded first client public key using the first client public key 722 and the first cryptographic nonce. In some embodiments, the first client computer 720 may send the blinded first client public key in cleartext (although blinded by the first cryptographic notice) with the second request message 723 (e.g., the blinded first client public key is not encrypted using the first session key). In some embodiments, the first client computer 720 may include the first cryptographic nonce in the second request message 723, which is encrypted using the first session key. In some embodiments, the first client computer 720 may include a certificate of the first client computer 720 (which includes the first client public key 722) in the second request message 723, which is encrypted using the first session key. In some embodiments, the second request message 723 may be a multi-party message that includes the first request message 733 as an encrypted message portion.

The first client computer 720 can send the second request message 723 to the second client computer 730. The second client computer 730 may act as a proxy computer for the first client computer 720. At 703, the second client computer 730 receive the second request message 723 from the first client computer 720 and send the second request message 723 to the server computer 740.

At 704 the server computer 740 can receive the second request message 723. In some embodiments, the server computer 740 can also receive the blinded first client public key. The server computer 740 may generate the first session key using the blinded first client public key and the server private key 741. The server computer 740 may then decrypt the second request message 723 and obtain the first cryptographic nonce, the certificate of the first client computer 720, and the first request message 733 from the second client computer 730. In some embodiments the server computer 740 can generate the same blinded first client public key using the first cryptographic nonce included in the second request message 723 and the first client public key 722 which is stored at the server computer 740. Then, the server computer 740 can authenticate the first client computer 720 by validating the certificate of the first client computer 720.

In some embodiments the server computer 740 can also obtain the second client public key 732 along with the first request message 733. In some embodiments, the server computer 740 can generate the second session key using the second client public key 732 and the server private key 741.

Then the server computer 740 can decrypt the first request message 733. In response to receiving the first request message 733 from the second client computer 730, the server computer can obtain first data 743 for the second client computer 730. In response to receiving the second request message 723 from the first client computer 720, the server computer can obtain second data 745 for the first client computer. In some embodiments the first data 743 may comprise a first portion of a credential (e.g., a limited use key) and the second data 745 may comprise a second portion of the same credential.

The server computer 740 can generate a first response message 744 ("Rsp.1" in FIG. 7) in response, to the first request message 733. The first response message 744 can include the first data 743. In some embodiments, the server computer 740 can encrypt the first response message 744 using the second session key.

The server computer 740 can also generate a second response message 746 ("Rsp.2" in FIG. 7) in response to the second request message 723. The second response message 746 can include the second data 745 for the first client computer 720. In some embodiments, the server computer 740 can encrypt the second response message 746 using a third session key. In some embodiments, the server computer 740 may generate the third session key using the server private key 741, the first client public key 722 and a second cryptographic nonce. In some embodiments the server computer 740 can generate a blinded server public key using the second cryptographic nonce and the server public key 742. In some embodiments, the server computer 740 may include the blinded server public key in cleartext with the second response message 746. In some embodiments, the server computer 740 may include the second cryptographic nonce in the second response message 746, which is encrypted using the third session key. In some embodiments, the server computer may include a certificate of the server computer 740 (which includes the server public key 742) in the second response message 746, which is encrypted using the third session key. In some embodiments, the second response message 746 may be a multi-party message.

The server computer 740 can send the second response message 746 to the first client computer 720 via the second client computer 730, which can act as a proxy computer for the first client computer 720 by receiving, at 705, the second response message 746 from the server computer 740 and then sending the second response message 746 to the first client computer 720.

At 706, the first client computer 720 can receive the second response message 746 from the server computer 740 via the second client computer 730. In some embodiments, the first client computer 720 can receive the blinded server public key along with the second response message 746. The first client computer 720 can generate the third session key using the blinded server public key and the first client private key 721. The first client computer 720 can then decrypt the second response message 746 using the third session key to obtain the second data 745, the second cryptographic nonce, the certificate of the server computer 740 which includes the server public key 742, and the first response message 744. In some embodiments, the first client computer can generate the same blinded server public key using the second cryptographic nonce and the server public key 742. In some embodiments, the first client computer 720 can authenticate the server computer 740 by validating the certificate of the server computer 740.

The first client computer 720 can store the second data 745. The first client computer 720 can then send the first response message 744 to the second client computer 730. At 707, the second client computer 730 can receive the first response message 744. The second client computer 730 can decrypt the first response message 744 using the second session key to obtain first data 743, which can be stored at the second client computer 730.

Using the message flow diagram of FIG. 7, the server computer 740 can strongly authenticate the first client computer 720. Then, based on the authentication of the first client computer 720, the server computer 740 can provide data to the first client computer 720 and the second client computer 730 in a single response message (e.g., the second response message 746). Thus, the server computer 740 can trust the second client computer 730, which was previously untrusted, based on the authentication of the first client computer 720, which the server computer 740 trusts.

In some embodiment, the server computer 740 can format the second response message 746 such that the second client computer 730 can receive the first data 743 directly, without receiving the first data 743 from first client computer 720. For example, in some embodiments, the server computer 740 may include the second response message 746 inside of the response message 744, such that the second client computer 730 can decrypt the first response message 744, obtain the first data 743, and then send the second response message 746 to the first client computer 720.

B. Secure Communications Between a First Client Computer and a Server Computer via a Secure Communication Channel with a Second Client Computer FIG. 8 is a message flow diagram 800 of secure communications between a first client computer 820, a second client computer 830, and a server computer 840 with dual channel protection, in accordance with some embodiments. The message flow of FIG. 8 is similar to the message flow of FIG. 7 except as indicated below. The message flow of FIG. 8 provides for authentication of the first client computer 820 with the server computer 840 as describes above with respect to FIG. 7. However, the message flow of FIG. 8 expands upon the message flow of FIG. 7 by protecting a channel between the first client computer 820 and, the second client computer 830 in addition to protecting a channel between the first client computer 820 and the server computer 840.

This message flow of FIG. 8 enables the first client, computer 820 and the second client computer 830 to authenticate with the server computer 840 using a single multi-party request message sent to the server computer 840. After authentication, the server computer 840 can provide first data 843 ("Data1" in FIG. 8) to the second client computer 830 and second data 845 ("Data2" in FIG. 8) to the first client computer 820 another multi-party message. Thus, both the first client computer 820 and the second client computer 830 can be authenticated and receive different data from the server computer 840 using only one multi-party request message and one multi-party response message sent between the second client computer 830 and the server computer 840.

The first client computer 820 can store a first key pair including a first client private key 821 ("Client Priv. Key 1" in FIG. 8) and a first client public key 822 ("Client Pub. Key 1" in FIG. 8), which corresponds to the first client private key 821. The first client private key 821 can be an static private key and the first client public key 822 can be an static public key. In some embodiments, the first client computer 820 can generate the first client public key 822 using the first client private key 821. The first client computer can also store a server public key 842 ("Server Pub. Key in FIG. 8") of the server computer 840. The server public key 842 may be a static public key. In some embodiments, the first client computer 820 can be a smart watch that can directly communicate with the second client computer 830. In some embodiments, the first client computer 820 may not have a communication path to the server computer 840 without the second client computer 830 acting as a proxy computer. In some embodiments the first client computer 820 may include a secure element circuit for secure data storage which can be used for strong authentication of the first client computer 820.

The second client computer 830 can store a second key pair including a second client private key 831 ("Client Priv. Key 2" in FIG. 8) and a second client public key ("Client Pub. Key 2" in FIG. 8). The second client private key 831 can be an ephemeral private key and the second client public key 832 can be an ephemeral public key. In some embodiments, the second client computer 830 can generate the second client private key 831 and use the second client private key 831 to generate the second client public key 832. The second client computer can also store the server public key 842 of the server computer 840. In some embodiments, the second client computer 830 can be a mobile phone that can directly communicate with the first client computer 820. In some embodiments, the second client computer 830 can act as a proxy computer for the first client computer 820 in that the second client computer 830 can route communications received from the first client computer 820 as described herein. In some embodiment, the second client computer 830 may not include a secure element circuit, in some embodiments, the second client computer 830 may implement host card emulation (HCE) software instead of using a secure element circuit. HCE may be less secure than a secure element and authentication based on HCE may be less strong than authentication based on a secure element.

The server computer 840 can store a third key pair including a server private key 841 ("Server Priv. Key" in FIG. 8) and the server public key 842. The server private key 841 may be a static private key and the server public key 842 may be a static public key. Prior to the communication flow of FIG. 8, the first client computer 820 and the second client, computer 830 may have obtained the server public key 842. In some embodiments, the server computer 840 may trust the first client computer 820 but may not trust the second client computer 830. For example, the server computer 840 may trust a secure element of the first client computer 820 but may not trust HCE implemented on the second client computer 830. However, the server computer 840 may only be in communication with the second client computer 830 and may not be able to communicate with the first client computer 820 unless the second client computer 830 acts as a proxy computer for the first client computer 820.

At 801, the second client computer 830 can generate a first request message 833 that requests first data 843 from the server computer 840. The second client computer 830 can send the first request message 833 to the first client computer 820. In some embodiments, the second client computer 830 may send the first request message 833 using bluetooth communications or using near-field communications. In some embodiments, the second client computer 830 may send the first request message 833 to the first client computer 820 to be wrapped in a request message from the first client computer 820 because the first client computer 820 may be trusted by the server computer 840 and the second client computer 830 may not be trusted by the server computer 840. In some embodiments, the second client computer 830 and the first client computer 820 may trust each other because they may be within close proximity of one another (e.g., within a bluetooth communication range or a near-field communication range).

In some embodiments, the second client computer 830 may encrypt the first request message 833 using a second session key that is for communicating with the server computer 840. The second client computer 830 may generate the second session key using the second client private key 831 and the server public key 842. The second client computer 830 may include the second client public key 832 in a cleartext portion of the first request message 833 (e.g., the second client public key 832 is in cleartext and it is not encrypted using the second session key).

In some embodiments, the second client computer 830 can generate a third request message 834 ("Req.3" in FIG. 8) that includes the first request message 833. The second client computer 830 can generate a client session key for encrypting the third request message 834. The second client computer 830 can generate the client session key using the second client private key 831 and the first client public key 822, which is stored at the second client computer 830. The second client computer can encrypt the third request message 834 using the client session key and send the third request message 834 to the first client computer 820. The second client computer 830 can send the second client public key 832 to the first client computer 820, in cleartext, with the third request message 834.

As such, the first request message 833, which is encrypted for the server computer 840, is wrapped in the third request message 834, which is encrypted for the first client computer 820. Thus, the communications between the second client computer 830 and the first client computer 820 are protected in addition the communication between second client computer 830 and the server computer 840 being protected.

At 802, the first client computer 820 can receive the third request message 834, which includes the first request message 833, from the second client computer 830. The first client computer can generate the client session key using the first client private key 821 and the first client public key 822 that is received in cleartext along with the third request message 834. Then the first client computer 820 can decrypt the third request message 834 using the client session key to obtain the first request message 833, which has been encrypted by the second client computer 830 using the second session for (for communicating with the server computer 840) as discussed above.

Then, the first client computer 820 can generate a second request message 823 ("Req.2" in FIG. 8) for the server computer8. The second request message 823 can request second data 845 ("Data2" in FIG. 8) from the server computer 840. The second request message 823 can include the first request message 833 that was received from the second client computer 830. In some embodiments, the first request message 833, which is included in the second request message 823 may be encrypted using the second session key.

In some embodiments, the first client computer 820 can generate a first session key that is for communicating with the server computer 840. The first client computer can generate the first session key using the first client private key 821, the server public key 842, and a first cryptographic nonce (e.g., a random number generated by the first client computer 820). In some embodiments, the first client computer 820 can encrypt the second request message 823 using the first session key. In some embodiments, the first client computer 820 may generate a blinded first client public key using the first client public key 822 and the first cryptographic nonce. In some embodiments, the first client computer 820 may send the blinded first client public key in cleartext (although blinded by the first cryptographic nonce) with the second request message 823 (e.g., the blinded first client public key is not encrypted using the first session key). In some embodiments, the first client computer 820 may include the first cryptographic nonce in the second request message 823, which is encrypted using the first session key. In some embodiments, the first client computer 820 may include a certificate of the first client computer 820 (which includes the first client public key 822) in the second request message 823, which is encrypted using the first session key. In some embodiments, the second request message 823 may be a multi-party message that includes the first request message 833 as an encrypted message portion.

In some embodiments, the first client computer 820 can generate a third response message 824 ("Rsp.3" in FIG. 8) that includes the second request message 823. The first client computer can encrypt the third response message 824 using the client session key and send the third response message 824 to the second client computer 830. At 803, the second client computer 830 can decrypt the third response message 824 using the client session key to obtain the second request message 823. As such, the communications between the first client computer 820 and the second client computer 830 are secured using the client session key. Then, the second client computer 830 can act as a proxy computer for the first client computer 820 and send the second request message 823 to the server computer 840.

At 804, the server computer 840 can receive the second request message 823. In some embodiments, the server computer 840 can also receive the blinded first client public key. The server computer 840 may generate the first session key using the blinded first client public key and the server private key 841. The server computer 840 may then decrypt the second request message 823 and obtain the first cryptographic nonce, the certificate of the first client computer 820, and the first request message 833 from the second client computer 830. In some embodiments the server computer 840 can generate the same blinded first client public key using the first cryptographic nonce included in the second request message 823 and the first client public key 822 which is stored at the server computer 840. Then, the server computer 840 can authenticate the first client computer 820 by validating the certificate of the first client computer 820.

In some embodiments the server computer 840 can also obtain the second client public key 832 along with the first request message 833. In some embodiments, the server computer 840 can generate the second session key using the second client public key 832 and the server private key 841. Then the server computer 840 can decrypt the first request message 833. In response to receiving the first request message 833 from the second client computer 830, the server computer can obtain first data 843 for the second client computer 830. In response to receiving the second request message 823 from the first client computer 820, the server computer can obtain second data 845 for the first client computer. In some embodiments the first data 843 may comprise a first portion of a credential (e.g., a limited use key) and the second data 845 may comprise a second portion of the same credential.

The server computer 840 can then generate a first response message 844 ("Rsp.1" in FIG. 8) in response to the first request message 833. The first response message 844 can include the first data 843. In some embodiments, the server computer 840 can encrypt the first response message 844 using the second session key.

The server computer 840 can also generate a second response message 846 ("Rsp.2" in FIG. 8) in response to the second request message 823. The second response message 846 can include the second data 845 for the first client computer 820. In some embodiments, the server computer 840 can encrypt the second response message 846 using a third session key. In some embodiments, the server computer 840 may generate the third session key using the server private key 841, the first client public key 822, and a second cryptographic nonce. In some embodiments the server computer 840 can generate a blinded server public key using the second cryptographic nonce and the server public key 842. In some embodiments, the server computer 840 may include the blinded server public key in cleartext with the second response message 846. In some embodiments, the server computer 840 may include the second cryptographic nonce in the second response message 846, which is encrypted using the third session key. In some embodiments, the server computer may include a certificate of the server computer 840 (which includes the server public key 842) in the second response message 846, which is encrypted using the third session key. In some embodiments, the second response message 846 may be a multi-party message.

The server computer 840 can send the second response message 846 to the first client computer 820 is the second client computer 830, which can act as a proxy computer for the first client computer 820 by receiving, at 805, the second response message 846 from the server computer 840. In some embodiments, the second client computer 830 can generate a fourth request message 835 ("Req.4" in FIG. 8) that includes the second response message 846. The second client computer 830 can generate a second client session key for encrypting the fourth request message 835 for the first client computer 820. The second client computer 830 can generate the second client session key using the second client private key 831 and the first client public key 822, which is stored at the second client computer 830. In some embodiments, the second client computer 830 can generate the fourth request message 835 using a different private key (e.g., a newly generated ephemeral private key). The second client computer can then encrypt the fourth request message 835 using, the second client session key and send the fourth request message 835 to the first client computer 820. The second client computer 830 can send the public key that corresponds to the private key that was used to generate the second client session key to the first client computer 820, in cleartext, with the fourth request message 835.

At 806, the first client computer 820 can receive the fourth request message 835 which includes the second response message 846 from the server computer. The first client computer can generate the second client session key using the first client public key 822 and the public key that received from the second client computer 830 along with the fourth request message 835. The first client computer 820 can then decrypt the fourth request message 835 to obtain the second response message 846 from the server computer.

In some embodiments, the first client computer 820 can receive the blinded server public key along with the second response message 846. The first client computer 820 can generate the third session key using the blinded server public key and the first client private key 821. The first client computer 820 can then decrypt the second response message 846 using the third session key to obtain the second data 845, the second cryptographic nonce, the certificate of the server computer 840 which includes the server public key 842, and the first response message 844. In some embodiments, the first client computer can generate the same blinded server public key using the second cryptographic nonce and the server public key 842. In some embodiments, the first client computer 820 can authenticate the server computer 840 by validating the certificate of the server computer 840. The first client computer 820 can store the second data 845.

The first client computer 820 can then generate a fourth response message 825 in response to the fourth request message 835 that was received from the second client computer 830. The fourth response message 825 can include the first response message 844 that was generated by the server computer 840. The first client computer 820 can encrypt the fourth response message 825 using the second client session key and send the fourth response message 825 to the second client computer 830. The second client computer 830 can decrypt the fourth response message 825 using the second client session key. Then, the second client computer 830 can decrypt the first response message 844 using the second session key to obtain first data 843, which can be stored at the second client computer 830.

Using the message flow of FIG. 8, the server computer 840 can strongly authenticate the first client computer 820. Then, based on the authentication of the first client computer 820, the server computer 840 can provide data to the first client computer 820 and the second client computer 830 in a single response message (e.g., the second response message 846). Thus, the server computer 840 can trust the second client computer 830, which was previously entrusted, based on the authentication of the first client computer 820, which the server computer 840 trusts. Furthermore, the message flow of FIG. 8 provides a secure channel between the first client computer 820 and the second client computer 830 in addition to the secure channel between the first client computer 820 and the server computer 840.

V. Implementations of Multi-Party Messaging

The multi-party messaging described herein may be implemented in the systems and methods describes in the follow patent applications: International Application No. PCT/US2016/040586 filed on Jun. 30, 2016; International Application No. PCT/US2016/040590 filed on Jun. 30, 2016; U.S. patent application Ser. No. 15/045,052 filed on Feb. 16, 2016; U.S. patent application Ser. No. 14/841,589 filed on Aug. 31, 2015; U.S. patent application Ser. No. 14/743,874 filed on Jun. 18, 2015; and U.S. patent application Ser. No. 14/595,792 filed on Jan. 13, 2015, the disclosures of which are incorporated by reference in their entirety for all purposes.

VI. Methods for Secure Multi-Party Messaging

Methods for secure multi-party messaging are described below with reference to FIGS. 9-11. These methods can be implemented by the computer systems described above with respect to FIGS. 2 and 4-8, for example. The messages in the methods can be similar to the multi-party message described above with respect to FIG. 3.

A. Generating Secure Communications Involving a Proxy

Figure 9:
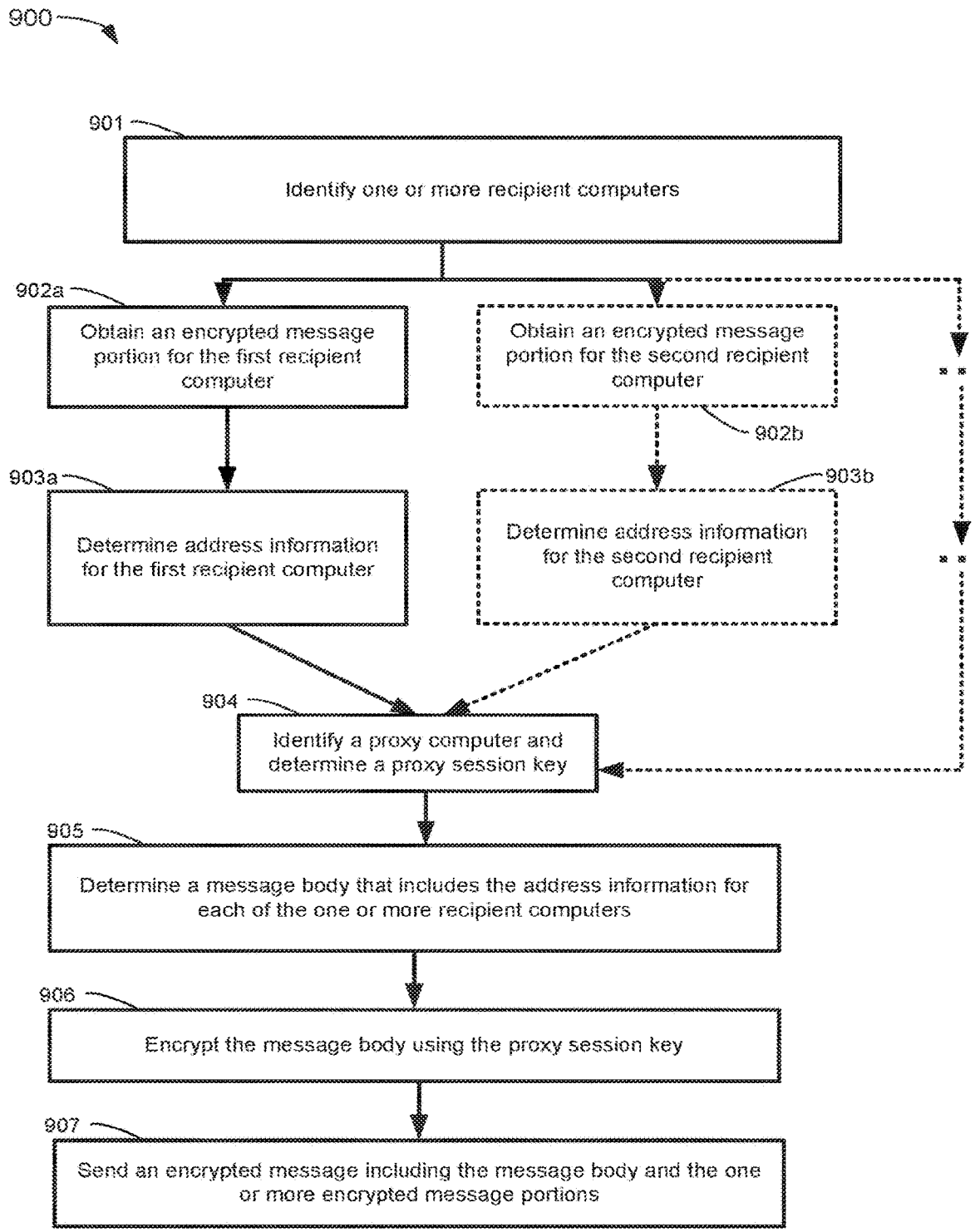
FIG. 9 shows a flow chart of an exemplary method for generating secure communications involving a proxy, in accordance with some embodiments.
Figure 10:
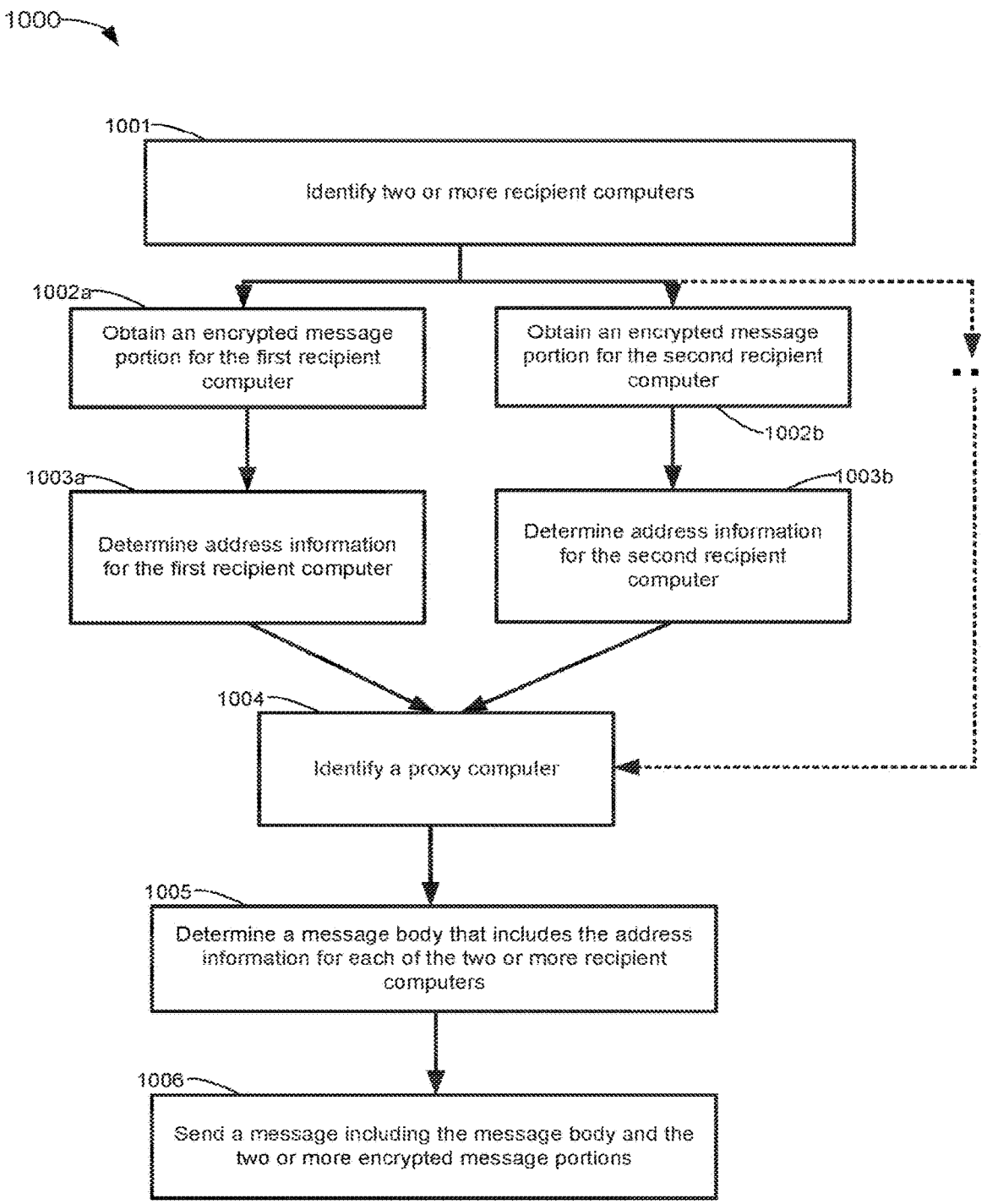
FIG. 10 shows a flow chart of an exemplary method for generating secure communications involving a proxy and two or more recipient computers, in accordance with some embodiments.

FIG. 9 shows a flow chart 900 of an exemplary method for generating secure communications involving a proxy, in accordance with some embodiments. For example, the method can be performed by a client computer as described above with reference to FIGS. 2 and 4-8. At 901, the client computer can identify one or more recipient computers to communicate with. For each of the one or more recipient computers, the client computer can obtain an encrypted message portion that is for that recipient computer. The encrypted message portion a be generated by encrypting a message portion for the recipient with a recipient session key that is for that recipient. For example, 902*a*, the client computer can obtain an encrypted message portion for a first recipient computer. If there are more than one recipient computer, at 902*b* the client computer can obtain an encrypted message portion for a second recipient computer. The client computer can continue to obtain encrypted message portions for each of the recipient computers as indicated by the ellipsis in FIG. 9. For each message portion, the client computer can determine a recipient session key for the corresponding the recipient computers and encrypt the message portion using the recipient session key to obtain the encrypted message portion.

The client computer can determine address information for each of the recipient computers. For example, at 903*a*, the client computer can determine address information for the first recipient computer. The address information can include information for routing the encrypted message portion that is for the first recipient computer to the first recipient computer. If there are more than one recipient computer, then at 903*b*, the client computer can determine address information for the second recipient computer. The client computer can continue to determine address information for each of the recipient computers as indicated by the ellipsis in FIG. 9.

At 904, the client computer can identify a proxy computer. The client computer may also be in communication with the proxy computer or have previously communicated with the proxy computer. The client computer can identify the proxy computer based on the address information of the recipient computers. For example, different proxy computers may be able to route messages for different recipient computers. The proxy computer identifier may be able to route the encrypted message portions to each of the identified recipient computers.

At 905, the client computer can determine a proxy session key. The proxy session key may be derived from a shared secret that is shared between the client computer and the proxy computer. The shared secret can be established by the client computer using a public key of the proxy computer and a private key of the client computer. The same shared secret can be established by the proxy computer using a public key of the client computer and a private key of the proxy computer. The public key of the client computer may be blinded using a blinding factor or it may be an ephemeral public key. In addition, the public key of the proxy computer may be blinded using a blinding factor. As such, the public keys communicated by the client computer and the proxy computer for establishing the shared secret may be confidential, as discussed above.

At 905, the client computer can determine a message body. The message body can be a message body of a multi-party message as described above. The message body can include address information for each of the one or more recipient computers. The message body may also include a public key corresponding to a private key that was used to establish a shared secret with the proxy computer as discussed above.

At 906, the client computer can use the proxy session key to encrypt the message body. As such, the client computer can obtain an encrypted message body that is encrypted using the proxy session key. The one or more encrypted message portions may also be encrypted using the proxy session key. As such, the one or more encrypted message portions may be encrypted with a second layer of encryption. The encrypted message body and the one or more encrypted message portions can form an encrypted message. The one or more encrypted message portions may also be sent to the proxy computer in a clear text part of the encrypted message. However, the one or more encrypted message portions remain secure because while they are sent in the clear text part of the encrypted message, they are still encrypted for the recipient computers.

At 907, the client computer can send the encrypted message to the proxy computer. The proxy computer can receive the encrypted message which includes the encrypted message body and the one or more encrypted message portions. The proxy compute can generate the same proxy session key and decrypt the encrypted message to obtain the message body and the encrypted message portions. The proxy computer may not have the encryption keys needed to decrypt the encrypted message portions because the message portions are encrypted for their corresponding recipient computer. Thus, the encrypted message portions remain secure while being communicated via the proxy computer.

B. Generating Secure Communications Involving a Proxy and Two or More Recipient Computers FIG. 10 shows a flow chart 1000 of an exemplary method for generating secure communications involving a proxy and two or more recipient computers, in accordance with some embodiments. For example, the method can be performed by a client computer as described above with reference to FIGS. 2 and 4-8. The method of FIG. 10 is similar to the method of FIG. 9 except as described below. For example, the method of FIG. 10 involves two or more recipient computers whereas the method of FIG. 9 involves one or more recipient computers.

At 1001, the client computer can identify one or more recipient computers to communicate with. For each of the one or more recipient computers, the client computer can obtain an encrypted message portion that is for that recipient computer. The encrypted message portion can be generated by encrypting a message portion for the recipient with a recipient session key that is for that recipient. For example, 1002*a*, the client computer can obtain an encrypted message portion for a first recipient computer. If there are more than one recipient computer, at 1002*b* the client computer can obtain an encrypted message portion for a second recipient computer. The client computer can continue to obtain encrypted message portions for each of the recipient computers as indicated by the ellipsis in FIG. 10. For each message portion, the client computer can determine a recipient session key for the corresponding the recipient computers and encrypt the message portion using the recipient session key to obtain the encrypted message portion.

The client computer can determine address information for each of the recipient computers. For example, at 1003*a*, the client computer can determine address information for the first recipient computer. The address information can include information for routing the encrypted message portion that is for the first recipient computer to the first recipient computer. At 1003*b*, the client computer can determine address information for the second recipient computer. The client computer can continue to determine address information for each of the recipient computers as indicated by the ellipsis in FIG. 10.

At 1004, the client computer can identify a proxy computer. The client computer may also be in communication with the proxy computer or have previously communicated with the proxy computer. The client computer can identify the proxy computer based on the address information of the recipient computers. For example, different proxy computers may be able to route messages for different recipient computers. The proxy computer identifier may be able to route the encrypted message portions to each of the identified recipient computers.

The client computer may communicate with the proxy computer using unencrypted communicates. For example, the client computer may communicate with the proxy computer using unencrypted bluetooth communications or unencrypted communications. In some embodiments, the client computer can encrypt communications for the proxy computer. For example, the client computer can determine a proxy session key for communicating with the proxy computer. The proxy session key may be derived from a shared secret that is shared between the client computer and the proxy computer. The shared secret can be established by the client computer using a public key of the proxy computer and a private key of the client computer. The same shared secret can be established by the proxy computer using a public key, of the client computer and a private key of the proxy computer. The public key of the client computer may be blinded using a blinding factor or it may be an ephemeral public key. In addition, the public key of the proxy computer may be blinded using a blinding factor. As such, the public keys communicated by the client computer and the proxy computer for establishing the shared secret may be confidential, as discussed above.

At 1005, the client computer can determine a message body. The message body can be a message body of a multi-party message as described above. The message body can include address information for each of the one or more recipient computers. If the message for the proxy computer is encrypted, the message body may also include a public key corresponding to a private key that was used to establish a shared secret with the proxy computer as discussed above.

If communications with the proxy computer will be secured, the client computer can use the proxy session key to encrypt the message body. As such, the client computer can obtain an encrypted message body that is encrypted using the proxy session key. The one or more encrypted message portions may also be encrypted using the proxy session key. As such, the one or more encrypted message portions may be encrypted with a second layer of encryption. The encrypted message body and the one or more encrypted message portions can form an encrypted message. The one or more encrypted message portions may also be sent to the proxy computer in a clear text part of the encrypted message. However, the one or more encrypted message portions remain secure because while they are sent in the clear text part of the encrypted message, they are still encrypted for the recipient computers.

At 1006, the client computer can send the message to the proxy computer. The proxy computer can receive the message which includes the message body and the one or more encrypted message portions. If the message is encrypted, the proxy compute can generate the same proxy session key and decrypt the encrypted message to obtain the message body and the encrypted message portions. The proxy computer may not have the encryption keys needed to decrypt the encrypted message portions because the message portions are encrypted for their corresponding recipient computer. Thus, the encrypted message portions remain secure while being communicated via the proxy computer.

C. Routing Secure Communications Involving a Proxy

Figure 11:
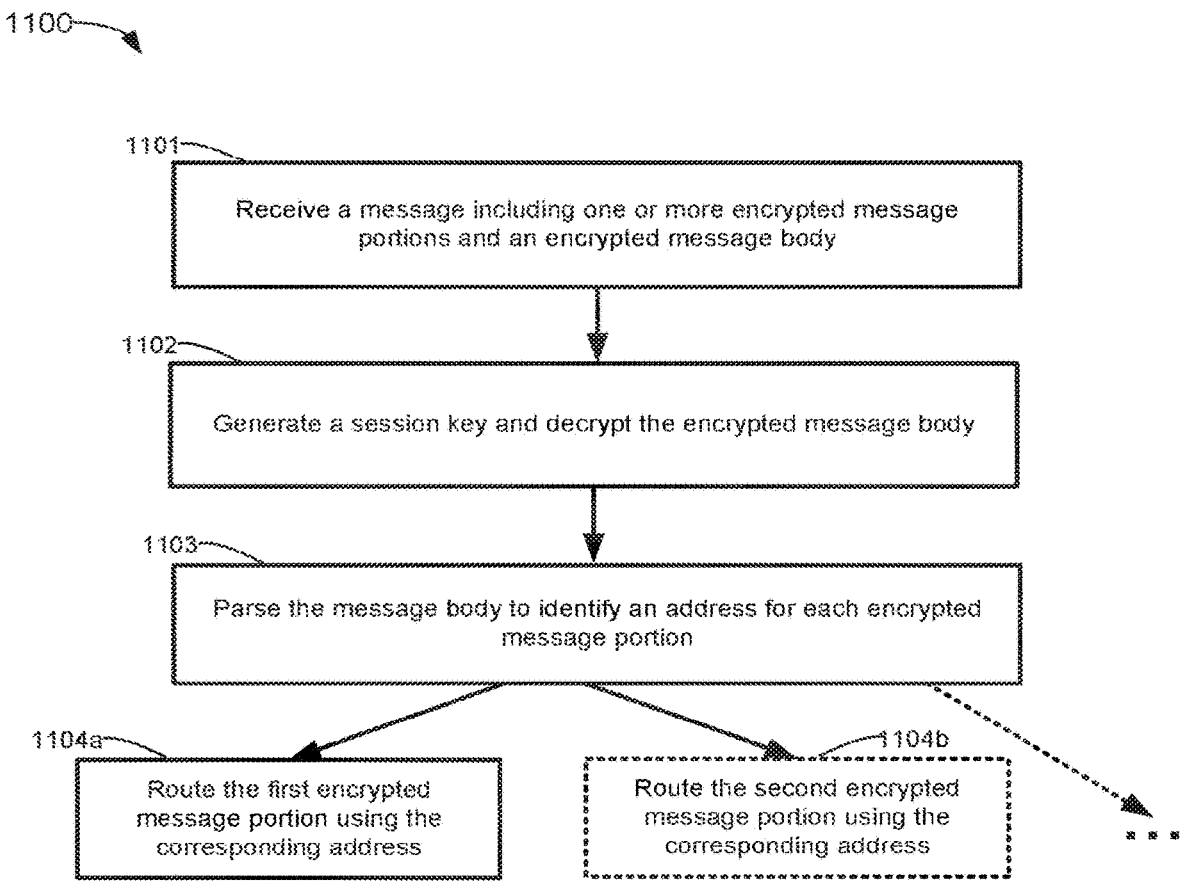
FIG. 11 shows a flow chart of an exemplary method for routing secure communications involving a proxy, in accordance with some embodiments.

FIG. 11 shows a flow chart 1100 of an exemplary method for routing secure communications involving a proxy, in accordance with some embodiments. For example, the method can be performed by a proxy computer as described above with reference to FIGS. 2 and 4-8. At 1101, the proxy computer can receive an encrypted message. The message can be received from a client computer as discussed above. The message may be a multi-party message. The encrypted message can include one or more encrypted message portions and an encrypted message body. In some embodiments, the message body is not encrypted while the encrypted message portions are encrypted. The message body can be encrypted using a different encryption key from the encryption key, or keys, used to encrypt the encrypted message portions.

At 1102, the proxy computer can generate a session key and use the session key to decrypt the encrypted message body. The session key can be derived from a shared secret that is shared with the computer (e.g., the client computer) that sent the encrypted message to the proxy computer. The proxy computer and the client computer can confidentially establish the shared secret as described above. Upon decrypting the encrypted message body using the session key, the proxy computer can obtain the message body. As discussed above, the message body can include address information that corresponds each of the recipient computers for the encrypted message portions. In some embodiments, the one or more encrypted message portions are included a clear text part of the encrypted message and are not decrypted using the session key.

At 1103, the proxy computer can parse the message body to identify an address for each encrypted message portion. The address may include routing information to route the encrypted message portion to the recipient computer. For example, the address for a recipient computer can be an address of the next computer in a communication route to the recipient computer. The address may also be the network address of the recipient computer itself.

Then, the proxy computer can route each of the encrypted message portion using the corresponding address for the recipient computer. At 1104*a*, the proxy computer can route the first encrypted message portion using the corresponding address for a first recipient computer. If the received message included more than one encrypted message portion, at 1104*b*, the proxy computer can route the second encrypted message portion using the corresponding address for a second recipient computer. The proxy computer can continue to route each of the encrypted message portions to each corresponding recipient computer based on the address information, as indicated by the ellipsis in FIG. 11.

The proxy computer may also secure the communications used to send or route the encrypted message portions to the corresponding recipient computers. For example, the proxy computer can generate a new session key that corresponds to a receiving device. The proxy computer can then use the new session key to encrypt one or more other addresses to obtain a new encrypted message. The new encrypted message including at least one encrypted message portions for each of the other addresses. Then the proxy computer can sending the new encrypted message to the receiving device. Similarly, the receiving device can use the one or more other addresses for routing one or more of the encrypted message portions in the new encrypted message.

VII. Computer System

Figure 12:
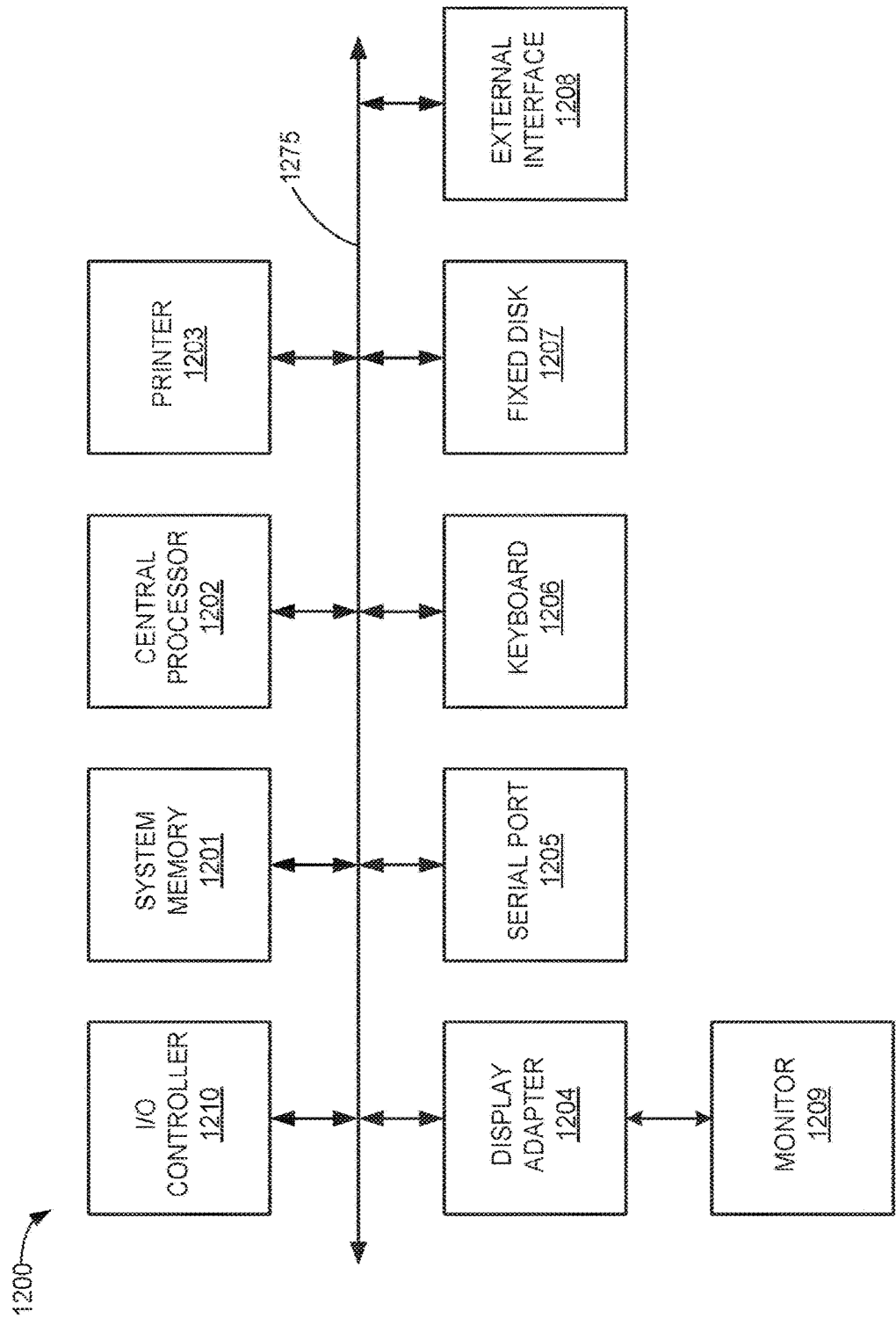
FIG. 12 is a block diagram of components of a computer system, in accordance with some embodiments.

FIG. 12 is a block diagram of components of a computer system 1200, in accordance with some embodiments. Any of the computer systems mentioned herein may utilize any suitable number of subsystems. Examples of such subsystems are shown in FIG. 12 in computer system 1200. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 12 are interconnected via a system bus 1275. Additional subsystems such as a printer 1274, keyboard 1278, storage device(s) 1279, monitor 1276, which is coupled to display adapter 1282, and others are shown. Peripherals and input/output (I/O) devices, which couple to I/O controller 1271, can be connected to the computer system by any number of means known in the art such as input/output (I/O)) port 1277 (e.g., VSB, FireWire®). For example, I/O port 1277 or external interface 1281 (e.g. Ethernet, etc.) can be used to connect computer system 1200 to a wide area network such as the Internet, a mouse input device, or a scanner. The interconnection via system bus 75 allows the central processor 1273 to communicate with each subsystem and to control the execution of instructions from system memory 1272 or the storage device(s) 1279 (e.g., a fixed disk, such as a hard drive, or optical disk), as well as the exchange of information between subsystems. The system memory 1272 and/or the storage device(s) 1279 may embody a computer readable medium. Another subsystem is a data collection device 1285, such as a camera, microphone, accelerometer, and the like. Any of the data mentioned herein can be output from one component to another component and can be output to the user.

A computer system can include a plurality of the same components or subsystems, e.g., connected together by external interface 1281 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated.

All patents, patent applications, publications, and descriptions mentioned herein are incorporated by reference in their entirety for all purposes. None is admitted to be prior art.

What is claimed is:

1. A method of performing secure communications involving a proxy, the method comprising:
   obtaining a first encrypted message portion generated by a source computer by encrypting a first message portion with a recipient session key;
   obtaining a second encrypted message portion generated by the source computer by encrypting a second message portion with the recipient session key;
   identifying a proxy computer;
   generating a proxy session key from a shared secret that is shared with the proxy computer;
   incorporating address information for each of a plurality of recipient computers into a message body;

using the proxy session key to encrypt the message body to obtain an encrypted message body that includes the address information for each of the plurality of recipient computers;

aggregating the encrypted message body, the first encrypted message portion and the second encrypted message portion into an encrypted message; and sending the encrypted message to the proxy computer, the encrypted message including the encrypted message body and the first and second encrypted message portions.

2. The method of claim 1, wherein, for each of the plurality of recipient computers:

the recipient session key that is used to encrypt the first or second message portion is derived from a shared secret that is established using an ephemeral private key, the ephemeral private key forming a key pair with an ephemeral public key; and wherein the message body includes the ephemeral public key for establishing the shared secret for deriving the recipient session key.

3. The method of claim 1, wherein, for each of the plurality of recipient computers:

the recipient session key that is used to encrypt the first or second message portion is derived from a shared secret that is established using a blinding factor and a private key, the private key forming a key pair with an ephemeral public key;

the first or second encrypted message portion includes the blinding factor; and the message body includes the ephemeral public key for establishing the shared secret for deriving the recipient session key.

4. The method of claim 1, wherein the proxy session key is also used to encrypt the first or second encrypted message portions to obtain the encrypted message.

5. The method of claim 1, wherein the first or second encrypted message portions are sent to the proxy computer in a clear text part of the encrypted message.

6. The method of claim 1, wherein at least one of the plurality of recipient computers corresponds to a secure element of a computer system that includes the proxy computer.

7. The method of claim 1, wherein obtaining an encrypted message portion includes:

determining a recipient session key for each of the plurality of recipient computers; and encrypting a message portion using the recipient session key to obtain an encrypted message portion.

8. The method of claim 1, further comprising:

identifying the plurality of recipient computers;

for each of the plurality of recipient computers, obtaining the first encrypted message portion and the second encrypted message portion.

9. The method of claim 1, wherein the first message portion is in response to a first request message from a first one of the plurality of recipient computers, and the second message portion is in response to a second request message from a second one of the plurality of recipient computers.

10. The method of claim 1, further comprising:

for each of the plurality of recipient computers:

determining address information for the recipient computer.

11. The method of claim 1, wherein the plurality of recipient computers are service providers that each provide different services to the source computer, the source computer is asynchronously connected to the proxy computer via wireless communication, the source computer providing message portions to the proxy computer, the message portions being encrypted to create at least the first or second encrypted message portions.

12. The method of claim 1, wherein the plurality of recipient computers are devices that are asynchronously connected to the proxy computer via wireless communications, and wherein the first or second encrypted message portions are obtained from the source computer that provides different services to the plurality of recipient computers.

13. A hub computer comprising:

a processor; and a memory element comprising code, executable by the processor, for implementing a method comprising:

obtaining a first encrypted message portion generated by a source computer by encrypting a first message portion with a recipient session key;

obtaining a second encrypted message portion generated by the source computer by encrypting a second message portion with the recipient session key;

identifying a proxy computer;

generating a proxy session key from a shared secret that is shared with the proxy computer;

incorporating address information for each of a plurality of recipient computers into a message body;

using the proxy session key to encrypt the message body to obtain an encrypted message body that includes the address information for each of the plurality of recipient computers;

aggregating the encrypted message body, the first encrypted message portion and the second encrypted message portion into an encrypted message; and sending the encrypted message to the proxy computer, the encrypted message including the encrypted message body and the first and second encrypted message portions.

14. The hub computer of claim 13, wherein the recipient session key that is used to encrypt the first or second message portion is derived from a shared secret that is established using an ephemeral private key, the ephemeral private key forming a key pair with an ephemeral public key; and the message body includes the ephemeral public key for establishing the shared secret for deriving the recipient session key.

15. The hub computer of claim 13, wherein the recipient session key that is used to encrypt the first or second message portion is derived from a shared secret that is established using a blinding factor and a private key, the private key forming a key pair with an ephemeral public key;

the first or second encrypted message portion includes the blinding factor; and the message body includes the ephemeral public key for establishing the shared secret for deriving the recipient session key.

16. The hub computer of claim 13, wherein the first message portion is in response to a first request message from a first one of the plurality of recipient computers, and the second message portion is in response to a second request message from a second one of the plurality of recipient computers, wherein the proxy session key is also used to encrypt the first or second encrypted message portions to obtain the encrypted message.

17. The hub computer of claim 13, wherein at least one of the plurality of recipient computers corresponds to a secure element of a computer system that includes the proxy computer.

18. The hub computer of claim 13, the method further comprising:

identifying the plurality of recipient computers;

determining a recipient session key and address information for each of the plurality of recipient computers; and encrypting a message portion using the recipient session key to obtain an encrypted message portion for each of the plurality of recipient computers including the first encrypted message portion and the second encrypted message portion.

19. The hub computer of claim 13, wherein the plurality of recipient computers are service providers that each provide different services to the source computer, the source computer is asynchronously connected to the proxy computer via wireless communication, the source computer providing message portions to the proxy computer, the message portions being encrypted to create at least the first or second encrypted message portions.

20. The hub computer of claim 13, wherein the plurality of recipient computers are devices that are asynchronously connected to the proxy computer via wireless communications, and wherein the first or second encrypted message portions are obtained from the source computer that provides different services to the plurality of recipient computers.

* * * * *